US012397545B2

(12) United States Patent
Morikawa

(10) Patent No.: US 12,397,545 B2
(45) Date of Patent: Aug. 26, 2025

(54) PRINTING APPARATUS, CONTROL METHOD FOR PRINTING APPARATUS, AND NON-TRANSITORY COMPUTER READABLE STORAGE MEDIUM

(71) Applicant: BROTHER KOGYO KABUSHIKI KAISHA, Nagoya (JP)

(72) Inventor: Shota Morikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 165 days.

(21) Appl. No.: 18/384,287

(22) Filed: Oct. 26, 2023

(65) Prior Publication Data

US 2024/0140087 A1 May 2, 2024

(30) Foreign Application Priority Data

Oct. 27, 2022 (JP) ................................ 2022-172415

(51) Int. Cl.
*B41J 2/045* (2006.01)

(52) U.S. Cl.
CPC ....... *B41J 2/04535* (2013.01); *B41J 2/04586* (2013.01)

(58) Field of Classification Search
CPC . B41J 2/2114; B41J 2/21; B41J 2/2103; B41J 2/211; B41J 2/2135; B41J 2/2132; B41J 2/04586; B41J 2/04535
See application file for complete search history.

(56) References Cited

U.S. PATENT DOCUMENTS

2015/0062654 A1 3/2015 Ono et al.
2023/0024356 A1* 1/2023 Ando ........................ B41J 2/15

FOREIGN PATENT DOCUMENTS

JP 2015050509 A 3/2015

* cited by examiner

*Primary Examiner* — Thinh H Nguyen
(74) *Attorney, Agent, or Firm* — K&L Gates LLP

(57) ABSTRACT

A printing apparatus is configured to execute first and second printing operations including forming a first layer by ejecting a first liquid to first and second regions, and forming a second layer by ejecting a second liquid on the first layer in the second region. In the first printing operation, the first liquid in a first predetermined amount is ejected to the first region and the first liquid in a second predetermined amount is ejected to the second region. In the second printing operation, the first liquid in a third predetermined amount is ejected to the first region and the first liquid in a fourth predetermined amount is ejected to the second region such that an absolute value of a difference between the fourth predetermined amount and the third predetermined amount is larger than that of a difference between the second predetermined amount and the first predetermined amount.

8 Claims, 13 Drawing Sheets

FIG. 9A

| R | G | B | C | M | Y | K |
|---|---|---|---|---|---|---|
| 255 | 255 | 255 | 0 | 0 | 0 | 0 |
| 255 | 255 | 240 | 0 | 0 | 3 | 0 |
| 255 | 255 | 224 | 0 | 0 | 6 | 0 |

FIG. 9B

| R | G | B | C | M | Y | K | W |
|---|---|---|---|---|---|---|---|
| 255 | 255 | 255 | 0 | 0 | 0 | 0 | 80 |
| 255 | 255 | 240 | 0 | 0 | 3 | 0 | 80 |
| 255 | 255 | 224 | 0 | 0 | 6 | 0 | 80 |

FIG. 9C

| R | G | B | C | M | Y | K | W |
|---|---|---|---|---|---|---|---|
| 255 | 255 | 255 | 0 | 0 | 0 | 0 | 100 |
| 255 | 255 | 240 | 0 | 0 | 3 | 0 | 80 |
| 255 | 255 | 224 | 0 | 0 | 6 | 0 | 80 |

FIG. 9D

| R | G | B | C | M | Y | K | W |
|---|---|---|---|---|---|---|---|
| 255 | 255 | 255 | 0 | 0 | 0 | 0 | 100 |
| 255 | 255 | 240 | 0 | 0 | 3 | 0 | 90 |
| 255 | 255 | 224 | 0 | 0 | 6 | 0 | 80 |

A
A5
25
21
E
E/4
REAR
FRONT
LEFT
RIGHT

A
A5
E/5
E
21
25
REAR
FRONT
LEFT
RIGHT

PRINTING APPARATUS, CONTROL METHOD FOR PRINTING APPARATUS, AND NON-TRANSITORY COMPUTER READABLE STORAGE MEDIUM

REFERENCE TO RELATED APPLICATIONS

This application claims priority from Japanese Patent Application No. 2022-172415 filed on Oct. 27, 2022. The entire content of the priority application is incorporated herein by reference.

BACKGROUND ART

The present disclosure relates to a printing apparatus, a control method for a printing apparatus, and a non-transitory computer readable storage medium storing a program.

As an example of a printing apparatus in the related art, a recorder ejects an ink from a recording head onto a recording medium while reciprocating the recording head along a scanning direction. Here, the recorder ejects a color ink after ejecting a white ink, thereby forming an underlayer formed by using the white ink on the recording medium, and then forming an image formed by using the color ink on the underlayer.

DESCRIPTION

According to the above recorder, the recording medium includes, for example, a region having only the underlayer and a region where the image is laminated on the underlayer. Since the colors of the underlayer and the image are respectively affected by amounts of the inks or the like, it is desirable that the ink for forming the underlayer and the ink for forming the image are respectively ejected in appropriate amounts corresponding to the respective regions. An upper layer formed by using a clear ink or the like may be formed on the recording medium on which the image is formed. At this time, the recording medium is provided with a region having only the upper layer and a region where the upper layer is laminated on the image. Accordingly, in this case, it is desirable that the ink for forming the upper layer and the ink for forming the image are respectively ejected in appropriate amounts corresponding to the regions.

The disclosure has been made to in view of the above circumstances, and an object thereof is to provide a printing apparatus, a control method for a printing apparatus, and non-transitory computer readable storage medium a program capable of ejecting a liquid in an appropriate amount corresponding to a region of a printing medium.

The present disclosure provides a printing apparatus including: a first inkjet head configured to eject a first liquid to a printing medium; a second inkjet head configured to eject a second liquid different from the first liquid to the printing medium; and a control device. The control device is configured to: execute a first printing operation and a second printing operation as a printing operation, an ejection amount of the first liquid in the first printing operation being different from an ejection amount of the first liquid in the second printing operation. The printing operation includes: forming a first layer by ejecting the first liquid from the first inkjet head to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second inkjet head on the first layer in the second region. In the first printing operation, the control device causes the first liquid in a first predetermined amount to be ejected to the first region and causes the first liquid in a second predetermined amount to be ejected to the second region. In the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

The present disclosure provides a printing apparatus including: a first ejection device configured to eject a first liquid to a printing medium; a second ejection device configured to eject a second liquid different from the first liquid to the printing medium; and a control device. The control device is configured to: execute a first printing operation and a second printing operation as a printing operation, an ejection amount of the first liquid in the first printing operation being different from an ejection amount of the first liquid in the second printing operation. The printing operation includes: forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region. In the first printing operation, the control device causes the first liquid in a first predetermined amount to be ejected to the first region and causes the first liquid in a second predetermined amount to be ejected to the second region. In the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

The present disclosure provides a control method for a printing apparatus. The printing apparatus includes: a first ejection device configured to eject a first liquid to a printing medium; and a second ejection device configured to eject a second liquid to the printing medium. The control method includes: executing a first printing operation and a second printing operation as a printing operation, an ejection amount of the first liquid in the first printing operation being different from an ejection amount of the first liquid in the second printing operation. The printing operation includes: forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region. In the first printing operation, the control device causes the first liquid in a first predetermined amount to be ejected to the first region and causes the first liquid in a second predetermined amount to be ejected to the second region. In the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

The present disclosure provides a non-transitory computer readable storage medium storing a program for a printing apparatus. The printing apparatus includes: a first ejection device configured to eject a first liquid to a printing medium; and a second ejection device configured to eject a second liquid different from the first liquid to the printing medium. The program includes instructions that, when executed by a computer of the printing apparatus, cause the computer to execute: a first printing operation and a second printing operation as a printing operation, an ejection amount of the first liquid in the first printing operation being different from an ejection amount of the first liquid in the second printing operation. The printing operation includes: forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region. In the first printing operation, the first liquid in a first predetermined amount is caused to be ejected to the first region and the first liquid in a second predetermined amount is caused to be ejected to the second region. In the second printing operation, the first liquid in a third predetermined amount is caused to be ejected to the first region and the first liquid in a fourth predetermined amount is caused to be ejected to the second region such that an absolute value of a difference acquired by subtracting the fourth predetermined amount from the third predetermined amount is larger than an absolute value of a difference acquired by subtracting the second predetermined amount from the first predetermined amount.

The present disclosure can provide a printing apparatus, a control method for a printing apparatus, and non-transitory computer readable storage medium a program capable of ejecting a liquid in an appropriate amount corresponding to a region of a printing medium.

FIG. 9A is a diagram illustrating a first LUT;

FIG. 9B is a diagram illustrating a second LUT;

FIG. 9C is a diagram illustrating a third LUT;

FIG. 9D is a diagram illustrating a fourth LUT;

Hereinafter, an embodiment according to the present disclosure will be described in detail with reference to the drawings. In the following description, the same or corresponding elements are denoted by the same reference numerals in the drawings.

Printing Apparatus

Figure 1:
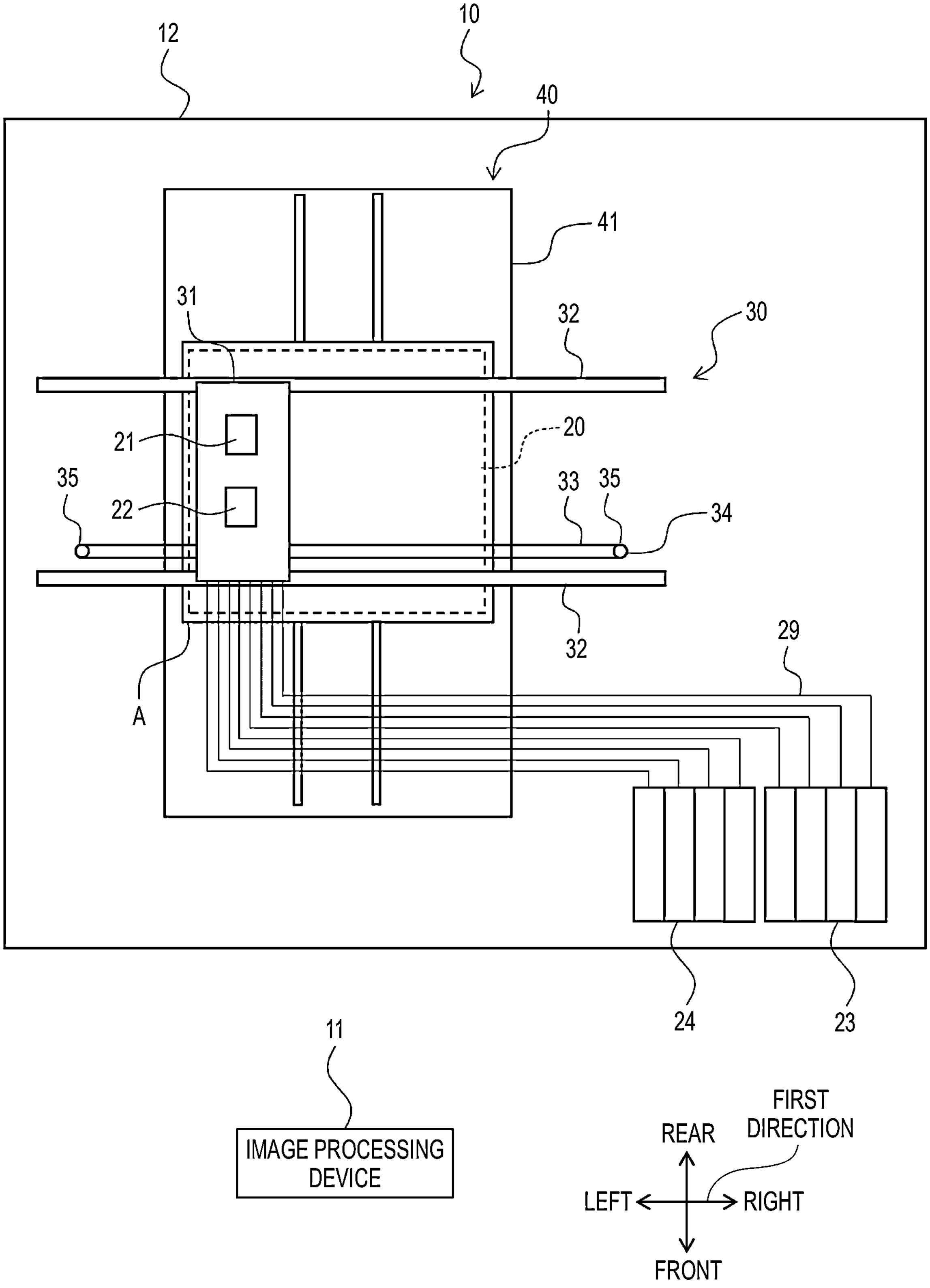
FIG. 1 is a schematic plan view illustrating a configuration of a printing apparatus according to an embodiment.

As illustrated in FIG. 1, a printing apparatus 10 according to the embodiment of the present disclosure includes an image processing device 11 and an output device 12. The image processing device 11 and the output device 12 are communicably connected to each other via a wireless method such as a network or a wired method such as a cable. The image processing device 11 generates printing data based on image data of a printing image B which is an image to be printed on a printing medium A by the output device 12, and transmits the generated printing data to the output device 12. The output device 12 prints the printing image B on the printing medium A based on the printing data received from the image processing device 11.

Output Device

The output device 12 is, for example, a serial head type inkjet printer. The output device 12 alternately repeats a pass process for ejecting inks to form ink layers C1 and C2 to be described later while moving first inkjet heads (hereinafter, referred to as "first heads") 21 and second inkjet heads (hereinafter, referred to as "second heads") 22 based on the printing data of the printing image B, and a transport process for transporting the printing medium A so as to print the printing image B on the printing medium A.

Hereinafter, a moving direction of the heads 21 and 22 is referred to as a first direction or a left-right direction, and a direction that is a transport direction of the printing medium A and intersects (for example, is orthogonal to) the first direction is referred to as a front-rear direction. In addition, a direction that intersects (for example, is orthogonal to) both the left-right direction and the front-rear direction is referred to as an up-down direction. However, directions relating to the output device 12 are not limited thereto.

The output device 12 includes a platen 20 arranged to face lower surfaces of the heads 21 and 22. The platen 20 is located below the heads 21 and 22 at a predetermined distance, and a flat upper surface of the platen 20 supports the printing medium A from below.

The output device 12 includes a movement device 30 that reciprocates the heads 21 and 22 along the left-right direction. The movement device 30 includes a carriage 31, two guide rails 32, an endless belt 33, and a movement motor 34. The carriage 31 is a box-like housing, and the plurality of heads 21 and 22 are mounted on the carriage 31. The two guide rails 32 extend in the left-right direction to cross above the platen 20 arranged immediately below the two guide rails 32, and are arranged apart from each other in the front-rear direction to sandwich all the heads 21 and 22. The carriage 31 is supported by the two guide rails 32 such that the carriage 31 can reciprocate along the left-right direction.

The endless belt 33 is provided to be wound around two pulleys 35 provided near left and right ends of one of the guide rails 32, and is connected to the carriage 31 at a predetermined position. A rotating shaft of the movement motor 34 is connected to any one of the left and right pulleys 35 via a speed reducer. Accordingly, in the movement device 30, when the movement motor 34 is rotationally driven, the endless belt 33 runs, and the carriage 31 supporting the heads 21 and 22 moves along the guide rails 32 in the left-right direction.

The output device 12 includes a transport device 40 that transports the printing medium A in the front-rear direction. The transport device 40 includes, for example, a base 41 and a linear motion actuator including a transport motor 42 and the like (see FIG. 3). When the transport motor 42 is driven, the linear motion actuator operates, and the printing medium A moves in the front-rear direction together with the platen 20.

The output device 12 includes a plurality of tanks 23 and 24 for respectively storing inks to be supplied to the heads 21 and 22. Ends of flexible tubes 29 are connected to the tanks 23 and 24, the other ends thereof are connected to ink supply ports of the heads 21 and 22, and the inks from the tanks 23 and 24 are supplied to the heads 21 and 22 through the tubes 29, respectively. The tanks 23 and 24 may be connected to the heads 21 and 22 in a one-to-one manner. In a case where the plurality of the heads 21 and 22 for ejecting inks having the same color are provided in the output device 12, one large-capacity tank 23 and one large-capacity tank 24 may be connected to the plurality of heads 21 and 22, respectively. In this case, the tube 29 branches from the tank 23 and the tank 24 to the plurality of heads 21 and 22, and the inks are supplied from the tank 23 and the tank 24 to the plurality of heads 21 and 22. Further, a plurality of nozzle rows may be provided in each of the heads 21 and each of the heads 22, and inks having different colors may be supplied to each of the nozzle rows, respectively.

For example, the plurality of tanks 23 and 24 are referred to as the first tanks 23 and the second tanks 24. The first tanks 23 store a first liquid and are connected to the first heads 21 by the tubes 29. The first liquid is, for example, a first ink such as a white ink, and is an undercoat ink to be printed on the printing medium A.

The second tanks 24 store a second liquid. The second liquid is a liquid different from the first liquid, is, for example, a second ink such as a color ink, and is an image ink to be printed on an underlayer. The color ink includes, for example, a cyan ink, a magenta ink, a yellow ink, and a black ink. In this case, the second tanks 24 are four types of second tanks 24 that store the four color inks, respectively. The four types of second tanks 24 are connected to four types of second heads 22 by the tubes 29, respectively.

Figure 2:
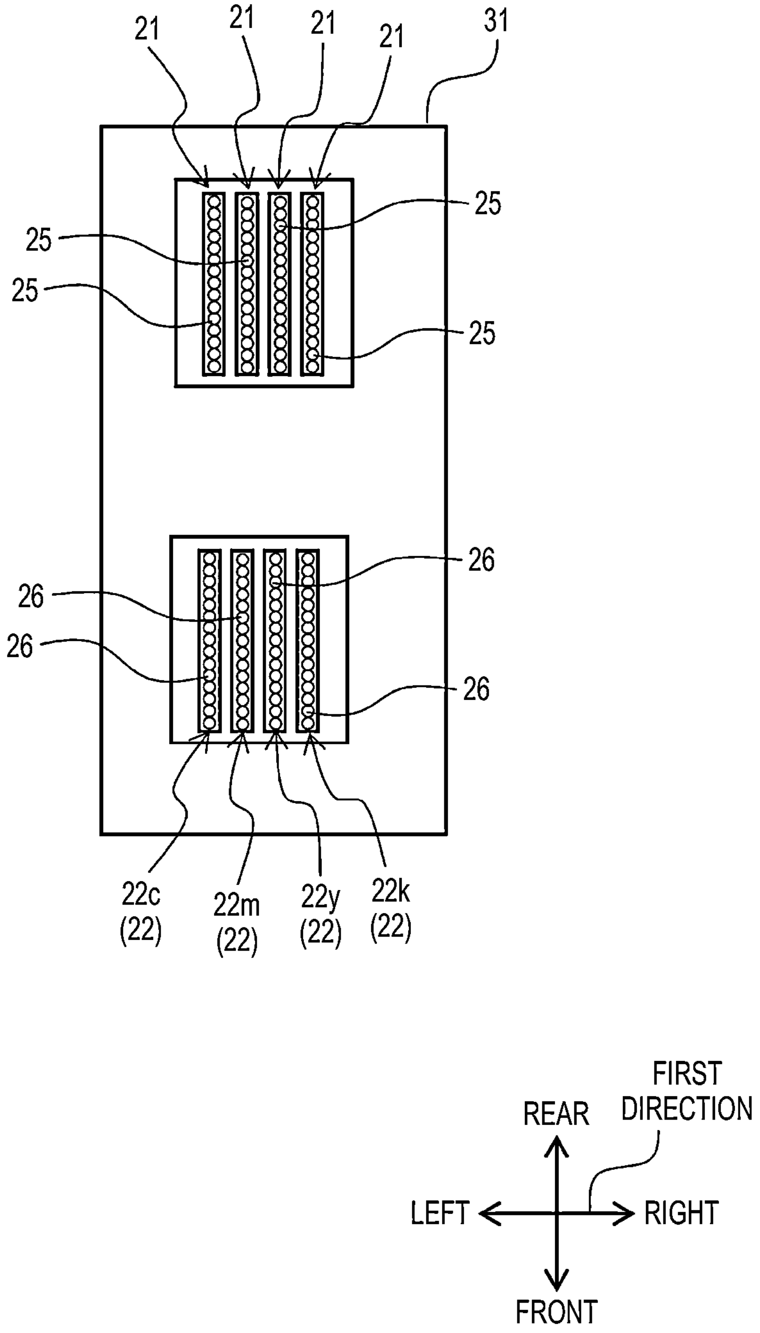
FIG. 2 is a schematic plan view illustrating a carriage provided in the printing apparatus.

As illustrated in the example of FIG. 2, for example, four first heads 21 and the four second heads 22 are mounted on the carriage 31. The first heads 21 are aligned with the second heads 22 in the front-rear direction and are arranged behind the second heads 22. The four first heads 21 are aligned at intervals in the left-right direction. Each of the four first heads 21 is a first ejection unit that ejects the white ink onto the printing medium A. Each of the first heads 21 includes a plurality of first nozzles 25 configured to allow the white ink to be ejected therefrom, and the plurality of first nozzles 25 are aligned in the front-rear direction in each of the first heads 21.

The four second heads 22 are aligned at intervals in the left-right direction. Each of the second heads 22 is a second ejection unit that ejects the corresponding color ink onto the printing medium A. Each of the second heads 22 includes a plurality of second nozzles 26 configured to allow the corresponding color ink therefrom, and the plurality of second nozzles 26 are aligned in the front-rear direction in each of the second heads 22. For example, the second heads 22 include a second head 22*c* that ejects the cyan ink, a second head 22*y* that ejects the yellow ink, a second head 22*m* that ejects the magenta ink, and a second head 22*k* that ejects the black ink.

Each of the first heads 21 is provided with a first drive element 27 (see FIG. 3) for the corresponding first nozzles 25. Each of the second heads 22 is provided with a second drive element 28 (see FIG. 3) for the corresponding second nozzles 26. The first drive element 27 and the second drive element 28 are piezoelectric elements, heating elements, electrostatic actuators, or the like, and are driven to apply pressures for ejecting the inks from the corresponding nozzles 25 and 26 to the inks in the heads 21 and 22, respectively.

Figure 3:
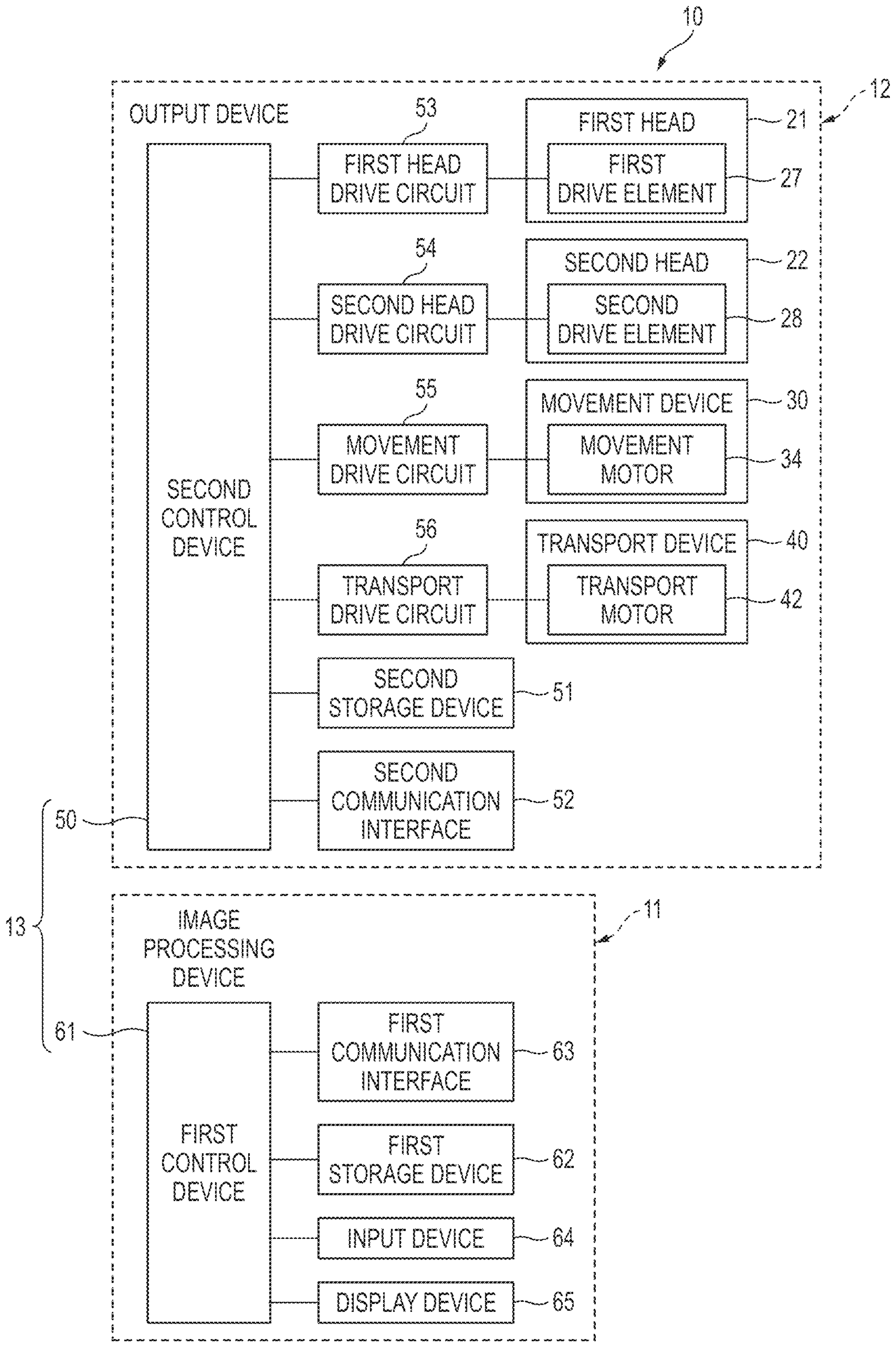
FIG. 3 is a block diagram illustrating a functional configuration of the printing apparatus.

As illustrated in FIG. 3, the output device 12 in the printing apparatus 10 includes a second control device 50, a second storage device 51, a second communication interface 52, a first head drive circuit 53, a second head drive circuit 54, a movement drive circuit 55, and a transport drive circuit 56, which are connected to the second control device 50.

The second storage device 51 is a memory accessible from the second control device 50 and includes, for example, a RAM and a ROM. Here, the RAM temporarily stores the printing data and various data during calculation of the second control device 50. The ROM stores computer programs and data for performing various data processing treatments.

The second control device 50 is implemented by, for example, a computer, and includes a circuit such as a processor like a CPU or an integrated circuit like an ASIC. The second control device 50 controls operations of respective parts of the output device 12 by executing the computer programs while referring to the data stored in the second storage device 51. The second control device 50 may be implemented by a single device, or may have a configuration in which a plurality of devices are arranged in a distributed manner and cooperate with each other to operate the output device 12.

The second communication interface 52 is a connection device connected to the image processing device 11. The output device 12 transmits and receives data such as the printing data to and from the image processing device 11 via the second communication interface 52.

The first head drive circuit 53 is electrically connected to the first drive element 27 provided in the first head 21, and controls an operation of the first drive element 27. That is, the second control device 50 outputs a control signal for driving the first drive element 27 to the first head drive circuit 53, and the first head drive circuit 53 generates a drive signal based on the received control signal, and outputs the drive signal to the first drive element 27. As a result, the first drive element 27 is driven based on the corresponding drive signal, and operates to apply predetermined ejection energy to the white ink in the first head 21 at a predetermined timing. Accordingly, an ejection timing of the white ink ejected from the first nozzles 25 and the size of the ejected white ink (the amount of ink droplets) can be controlled. Similarly to the first head drive circuit 53, the second head drive circuit 54 is electrically connected to the second drive element 28, and controls an operation of the second drive element 28. Accordingly, an ejection timing of the color ink ejected from the second nozzles 26 and the size of the ejected color ink (the amount of ink droplets) can be controlled.

The movement drive circuit 55 is electrically connected to the movement motor 34 provided in the movement device 30, and an operation of the movement motor 34 is controlled by the second control device 50 via the movement drive circuit 55. Accordingly, the movement device 30 can move the carriage 31 supporting the first heads 21 and the second heads 22 in the left-right direction at a variable speed, and can stop the carriage 31 at any position in a movable range of the carriage 31.

The transport drive circuit 56 is electrically connected to the transport motor 42 provided in the transport device 40, and an operation of the transport motor 42 is controlled by the second control device 50 via the transport drive circuit 56. Accordingly, the transport device 40 can intermittently or continuously transport the printing medium A on the platen 20 in the front-rear direction, and can stop and hold the printing medium A at a predetermined position on the platen 20.

Image Processing Device

As illustrated in the example of FIG. 3, the image processing device 11 provided in the printing apparatus 10 is a device that processes the printing image B, which is an image to be printed by the output device 12, and is implemented by, for example, a personal computer, a tablet, a smartphone, or the like. The image processing device 11 includes a first control device 61, a first storage device 62, a first communication interface 63, an input device 64, and a display device 65, which are connected to the first control device 61.

The first storage device 62 is a memory accessible from the first control device 61 and includes, for example, a RAM and a ROM. Here, the RAM temporarily stores the image data and various data during calculation of the first control device 61. The ROM stores computer programs and data for performing various data processing treatments. Examples of the image data include raster data indicating an image to be printed on the printing medium A.

The first control device 61 is implemented by, for example, a computer, and includes a circuit such as a processor like a CPU. The first control device 61 controls the operation of the output device 12 and an operation of the display device 65 by executing the computer programs while referring to the data stored in the first storage device 62. The first control device 61 configures the control device 13 of the printing apparatus 10 in cooperation with the second control device 50 of the output device 12, and controls the operation of the printing apparatus 10. The first control device 61 may be implemented by a single device, or may have a configuration in which a plurality of devices are arranged in a distributed manner and cooperate with each other to operate the output device 12.

The first communication interface 63 is a connection device connectable to the second communication interface 52 of the output device 12. The image processing device 11 transmits and receives data such as the printing data to and from the output device 12 via the first communication interface 63. The first communication interface 63 may be connected to an external device that exists independently of the printing apparatus 10. In this case, the image processing device 11 can transmit and receive data such as the image data to and from the external device via the first communication interface 63.

The display device 65 is a device that displays, based on the image data, information such as the printing image B which is an image to be printed by the output device 12, and is, for example, a display. The input device 64 is a device that accepts the input of information from the outside by, for example, a touch panel, a physical switch, and the first communication interface 63, and is provided at a position where the user can operate the input device 64, such as an upper surface or a front surface of a housing of the output device 12. Then, the input device 64 receives an operation by the user and outputs received operation information to the first control device 61.

Printing Operation

The control device 13 executes, as a printing operation, a first printing operation and a second printing operation different from the first printing operation in an ejection amount of the first liquid. According to the printing operation, the control device 13 forms a first layer C1 by causing the first liquid to be ejected from the first heads 21 to a first region A1 and a second region A2 different from the first region A1, and forms a second layer C2 by causing the second liquid to be ejected from the second heads 22 on the first layer C1 in the second region A2, the first region A1 is a predetermined region or a region designated by the user or a region where the second liquid is not ejected in the printing medium A.

Figure 4:
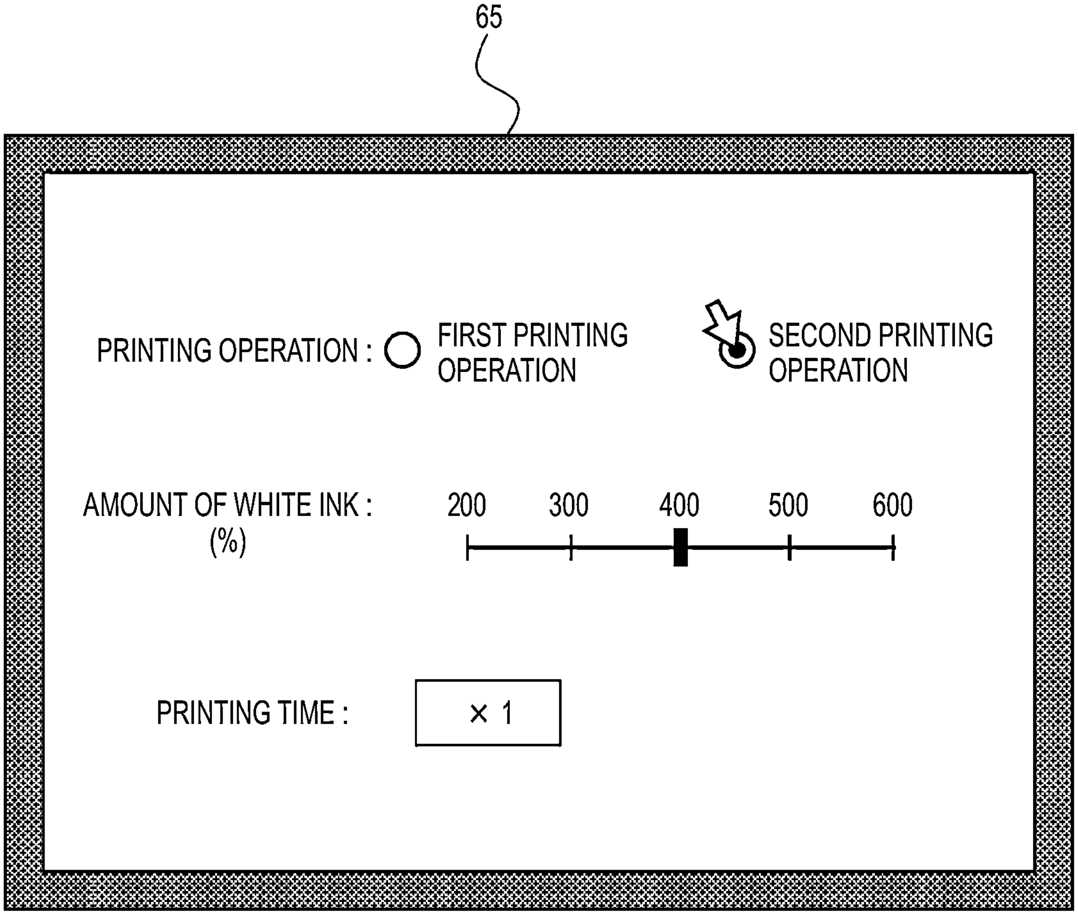
FIG. 4 is a schematic plan view that illustrates a display device displaying a setting screen.

For example, as illustrated in the example of FIG. 4, the first control device 61 of the image processing device 11 displays, on the display device 65, a setting screen for setting the first printing operation or the second printing operation as the printing operation. When the user sets the printing operation by using the input device 64, information indicating the set printing operation is input to the first control device 61. The first control device 61 generates the printing data based on the image data of the printing image B according to the set printing operation and transmits the printing data to the output device 12. Regarding the first printing operation and the second printing operation, the ejection amount of the white ink as the first liquid is different. The ejection amount of the ink and a generation process of the printing data will be described later.

Figure 5:
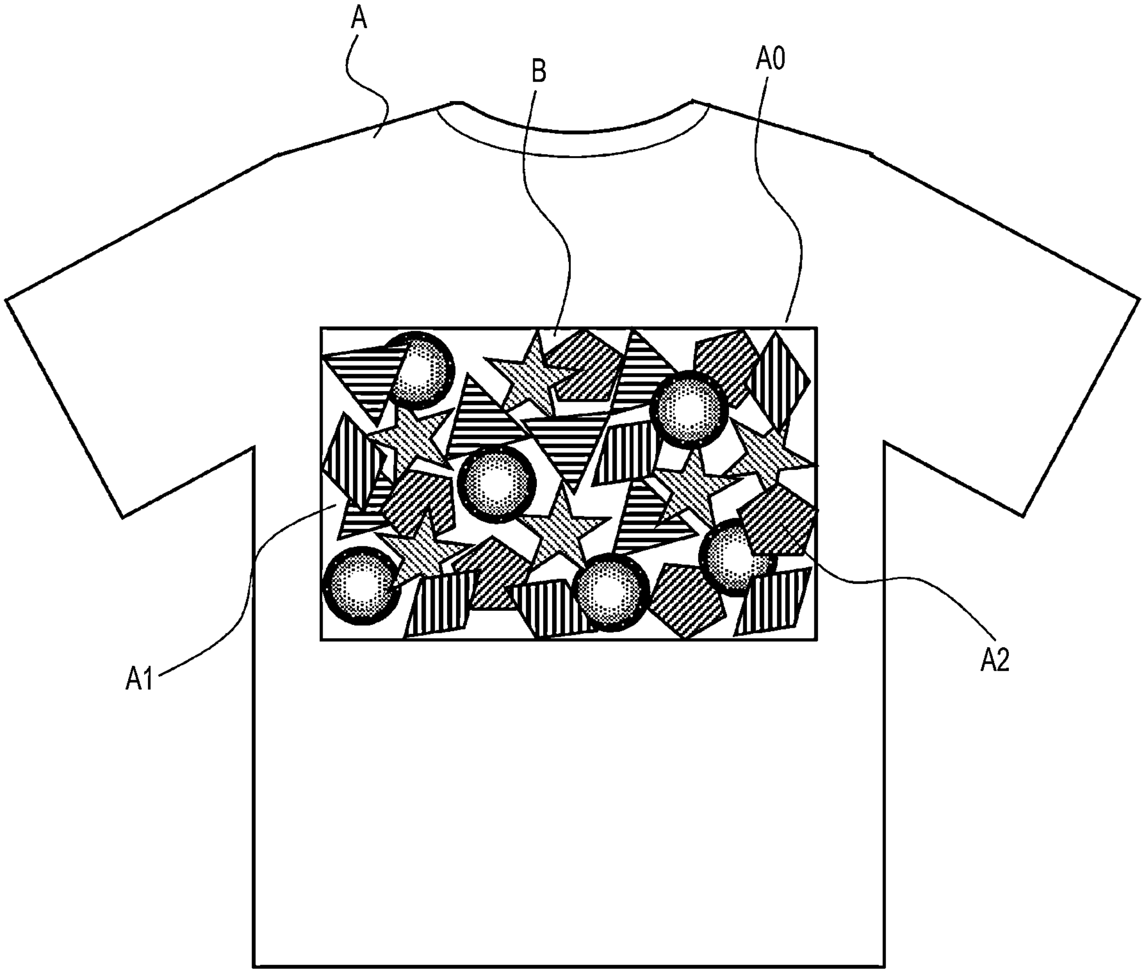
FIG. 5 is a schematic plan view illustrating a printing medium on which a printing image is printed.
Figure 6A:
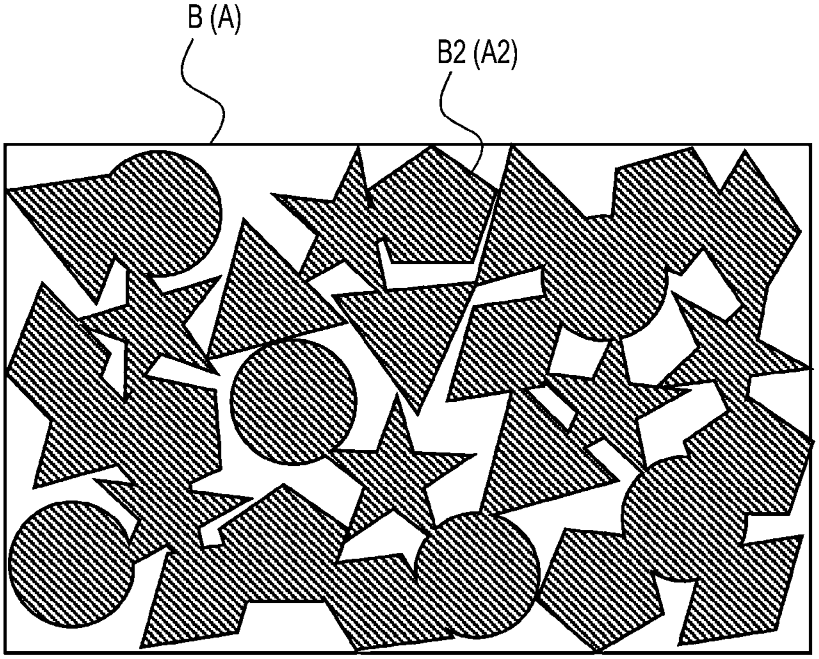
FIG. 6A is a diagram illustrating a second image portion of the printing image
Figure 6B:
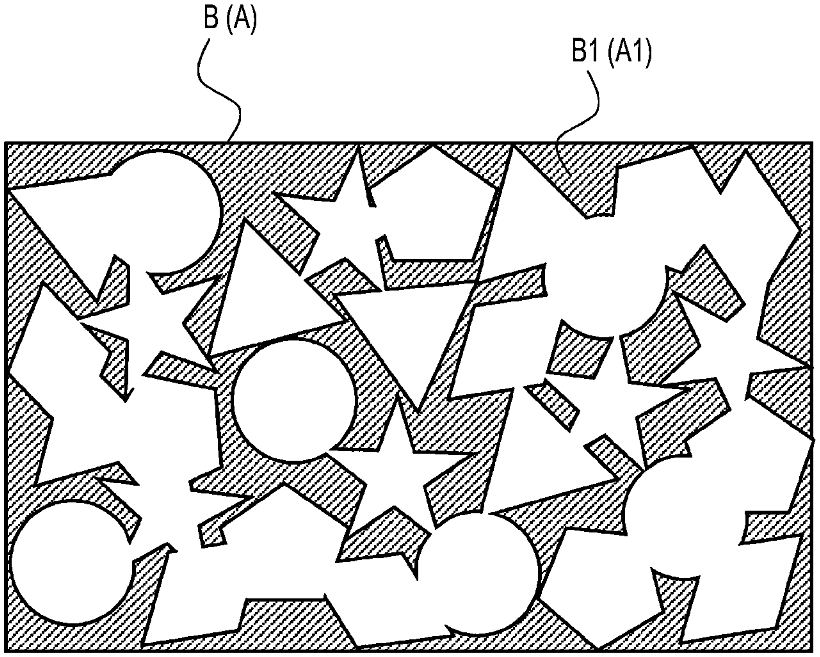
FIG. 6B is a diagram illustrating a first image portion of the printing image.

The second control device 50 of the output device 12 executes the printing operation based on the printing data from the image processing device 11, and prints the printing image B in a printing region A0 of a T-shirt as the printing medium A as illustrated in the example of FIG. 5. The printing image B includes a first image portion B1 (FIG. 6B) which is a portion defined by, for example, a predetermined color, a color designated by the user, layer data of the image data, or the like, and a second image portion B2 (FIG. 6A) which is a portion other than the first image portion B1. When the first image portion B1 is a portion defined by the layer data of the image data or the like, for example, the second image portion B2 is an image portion of the printing image B, and the first image portion B1 is a background portion of the image portion.

The printing image B is formed by a plurality of pixels acquired by dividing the printing image B into a plurality of regions. The first image portion B1 includes a first pixel, and the second image portion B2 includes a second pixel. In the printing region A0 of the printing medium A where the printing image B is printed, the first pixel of the first image portion B1 is printed in the first region A1, and the second pixel of the second image portion B2 is printed in the second region A2. The first pixel and the second pixel in the printing image B will be described later.

Figure 7A:
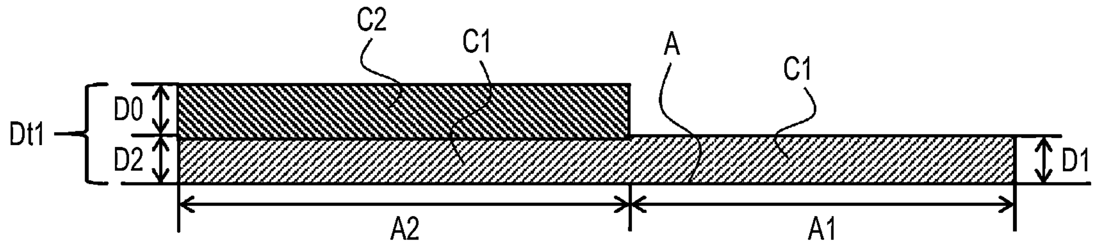
FIG. 7A is a cross-sectional view that illustrates the printing medium on which a first layer is formed and a second layer is not formed in a first region by a first printing operation.
Figure 7B:
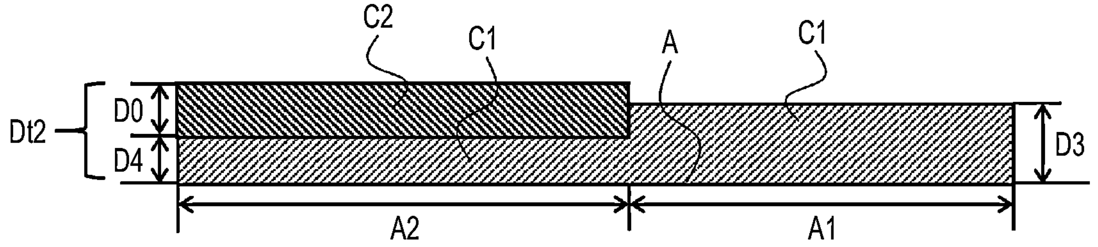
FIG. 7B is a cross-sectional view that illustrates the printing medium on which the first layer is formed and the second layer is not formed in the first region by a second printing operation.

When the first image portion B1 is a white portion, as illustrated in the examples of FIGS. 7A and 7B, the output device 12 ejects the white ink from the first heads 21 to the first region A1 and the second region A2 of the printing medium A to form (print) the first layer C1 formed by using the white ink in the first region A1 and the second region A2. Then, the output device 12 does not eject the color ink from the second heads 22 to the first region A1 but ejects the color ink onto the first layer C1 in the second region A2 to form (print) the second layer C2 formed by using the color ink on the first layer C1.

Therefore, the second layer C2 is laminated on the first layer C1 in the second region A2 of the printing medium A. The second layer C2 is seen by the user and constitutes the second image portion B2 in the printing image B, and the first layer C1 is covered with the second layer C2 and constitutes an underlayer of the second layer C2. In the first region A1 of the printing medium A, the second layer C2 is not formed, and the first layer C1 is formed. Accordingly, the first layer C1 is seen by the user and constitutes the first image portion B1 in the printing image B.

Figure 7C:
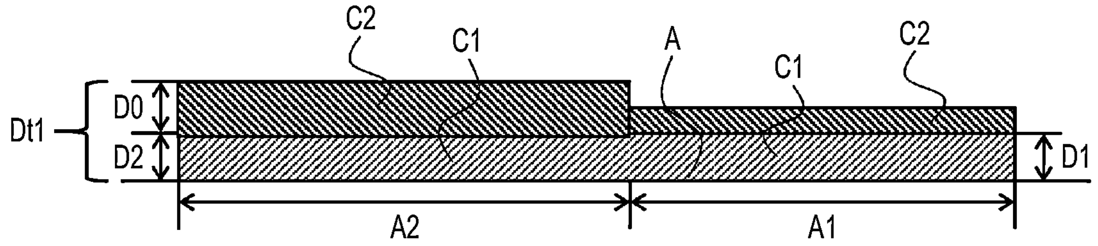
FIG. 7C is a cross-sectional view that illustrates the printing medium on which the first layer and the second layer are formed in the first region by the first printing operation.
Figure 7D:
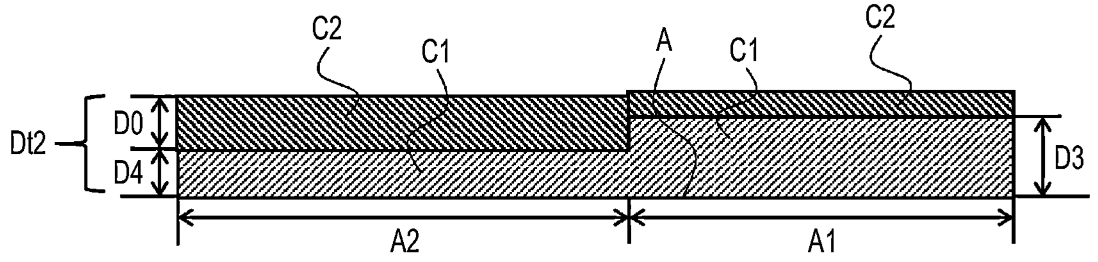
FIG. 7D is a cross-sectional view that illustrates the printing medium on which the first layer and the second layer are formed in the first region by the second printing operation.

In addition, when the first image portion B1 is a color portion, as illustrated in the examples of FIGS. 7C and 7D, the output device 12 ejects the white ink from the first heads 21 to the first region A1 and the second region A2 of the printing medium A to form (print) the first layer C1 formed by using the white ink in the first region A1 and the second region A2. Then, the output device 12 ejects the color ink from the second heads 22 onto the first layer C1 in the first region A1 and the second region A2 to form (print) the second layer C2 formed by using the color ink on the first layer C1. Accordingly, the second layer C2 is laminated on the first layer C1 in the first region A1 and the second region A2. In the first region A1, the second layer C2 is seen by the user and constitutes the first image portion B1 in the printing image B, and the first layer C1 is covered with the second layer C2 and constitutes the underlayer of the second layer C2.

When the first image portion B1 is a portion defined by the layer data of the image data or the like, the second region A2 may include a white region where the second layer C2 is not laminated on the first layer C1 in addition to a color region where the second layer C2 is laminated on the first layer C1. In addition, the first region A1 may include the color region where the second layer C2 is laminated on the first layer C1 in addition to the white region where the second layer C2 is not laminated on the first layer C1.

Ejection Amount of Ink

According to the first printing operation, the control device 13 ejects the first liquid in a first predetermined amount to the first region A1, and ejects the first liquid in a second predetermined amount to the second region A2. According to the second printing operation, the control device 13 ejects the first liquid in a third predetermined amount to the first region A1, and ejects the first liquid in a fourth predetermined amount to the second region A2 such that an absolute value of a difference acquired by subtracting the ejection amount of the first liquid to the second region A2 from the ejection amount of the first liquid to the first region A1 is larger than an absolute value of a difference acquired by subtracting the second predetermined amount from the first predetermined amount.

Specifically, since the ejection amount of the white ink as the first liquid is different according to the type of the printing operation, the first control device 61 determines the ejection amount of the white ink according to the printing operation set by the user. The ejection amount of the ink is an amount of the ink ejected to a unit region which is a region acquired by dividing the printing region A0 of the printing medium A into a plurality of regions, that is, an amount of the ink ejected from the heads 21 and 22 to the unit region of the printing medium A, and can be said to be, for example, concentration of the ink in the unit region. The size and the number of divisions of the printing region A0 may be set in advance, or may be set by the user. Further, the ink may be ejected from the heads 21 and 22 to the unit region of the printing medium A by performing the ejection operation once or a plurality of times. In this case, since a plurality of ink droplets are ejected to the unit region by performing the ejection operation a plurality of times, the total amount of the ink droplets ejected to the unit region is the ejection amount of the ink with respect to the unit region.

For example, when the first printing operation is set as the printing operation by the user, the first control device 61 determines the ejection amount of the white ink with respect to the first region A1 to the first predetermined amount, and determines the ejection amount of the white ink with respect to the second region A2 to the second predetermined amount. The first predetermined amount may be the same as the second predetermined amount, may be larger than the second predetermined amount, or may be smaller than the second predetermined amount. For example, when the second printing operation is set as the printing operation by the user, the first control device 61 determines the ejection amount of the white ink with respect to the first region A1 to the third predetermined amount, and determines the ejection amount of the white ink with respect to the second region A2 to the fourth predetermined amount. The third predetermined amount is different from the fourth predetermined amount, and is, for example, larger than the fourth predetermined amount. The first predetermined amount to the fourth predetermined amount may be amounts according to the type such as the color of the color ink ejected onto the first layer C1 formed by using the white ink. In this case, a relation between the type of the ink and the first predetermined amount to the fourth predetermined amount is determined in advance and is stored in the second storage device 51.

According to the first printing operation, as illustrated in the example of FIG. 7A, the first layer C1 having a first thickness D1 is formed by using the white ink in the first predetermined amount in the first region A1. The first layer C1 having a second thickness D2 is formed by using the white ink in the second predetermined amount in the second region A2, and the second layer C2 formed by using the color ink and having a thickness DO is formed on the first layer C1. Therefore, the second region A2 has a total thickness Dt1 acquired by adding the second thickness D2 of the first layer C1 and the thickness DO of the second layer C2. In addition, according to the second printing operation, as illustrated in the example of FIG. 7B, the first layer C1 having a third thickness D3 is formed by using the white ink in the third predetermined amount in the first region A1. The first layer C1 having a fourth thickness D4 is formed by using the white ink in the fourth predetermined amount in the second region A2, and the second layer C2 having the thickness DO is formed on the first layer C1. Therefore, the second region A2 has a total thickness Dt2 acquired by adding the fourth thickness D4 of the first layer C1 and the thickness DO of the second layer C2.

Here, the third predetermined amount is larger than the first predetermined amount, and a second difference, which is an absolute value of a difference acquired by subtracting the fourth predetermined amount from the third predetermined amount, is larger than a first difference that is the absolute value of the difference acquired by subtracting the second predetermined amount from the first predetermined amount. In this case, according to the second printing operation, the amount of the white ink in the first region A1 can be increased as compared with that in the first printing operation while securing the amount of the white ink in the second region A2 to be equivalent to that in the first printing operation. Accordingly, since the amount of the white ink forming the first layer C1 in the first region A1 according to the second printing operation is larger than that according to the first printing operation, according to the second printing operation, coloring of the first image portion B1 of the printing image B as the first layer C1 in the first region A1 can be further improved as compared with the first printing operation. On the other hand, according to the first printing operation, it is possible to restrain the consumption of the ink for printing on the printing image B.

In addition, when the fourth predetermined amount is smaller than the second predetermined amount and the second difference is larger than the first difference, according to the second printing operation, the amount of the white ink in the second region A2 can be reduced as compared with that in the first printing operation while securing the amount of the white ink in the first region A1 to be equivalent to that in the first printing operation. Therefore, it is possible to reduce bleeding of the white ink in the second region A2 and the color ink ejected onto the white ink. Accordingly, the coloring of the second image portion B2 of the printing image B as the second layer C2 formed by using the color ink in the second region A2 according to the second printing operation can be further improved as compared with that in the first printing operation.

In addition, the third predetermined amount may be larger than the first predetermined amount, the fourth predetermined amount may be smaller than the second predetermined amount, and the second difference may be larger than the first difference. In this case, according to the second printing operation, the coloring of the first image portion B1 and the second image portion B2 can be improved.

In addition, when the third predetermined amount is larger than the fourth predetermined amount, an absolute value of a difference between the third thickness D3 of the first layer C1 in the first region A1 and the total thickness Dt2 in the second region A2 in FIG. 7B is smaller than an absolute value of a difference between the first thickness D1 of the first layer C1 in the first region A1 and the total thickness Dt1 in the second region A2 in FIG. 7A. Therefore, according to the second printing operation, it is possible to reduce image quality deterioration of the printing image B due to the difference in thickness between the layers in the first region A1 and the second region A2.

First Pixel And Second Pixel

The printing image B includes the first image portion B1 including the first pixel and the second image portion B2 including the second pixel. The first control device 61 determines the first pixel of the first image portion B1 and the second pixel of the second image portion B2 in the printing image B based on the image data of the printing image B which is an image to be printed on the printing medium A. The image data of the printing image B includes pixel data including positions and color values of the pixels constituting the printing image B.

According to a first determination method, the first control device 61 may determine that pixels having a predetermined color value are the first pixel, and pixels having a color value other than the predetermined color value are the second pixel in the printing image B. When the predetermined color value is, for example, white, regarding image data defined by an RGB value, the first control device 61 determines that pixels having an RGB value (255, 255, 255) representing white are the first pixel, and pixels having other RGB values are the second pixel. Further, regarding image data defined by a CMYK value, the first control device 61 determines that pixels having a CMYK value (0, 0, 0, 0) representing white are the first pixel, and pixels having other CMYK values are the second pixel. The predetermined color value may be one or more color values.

Figure 8:
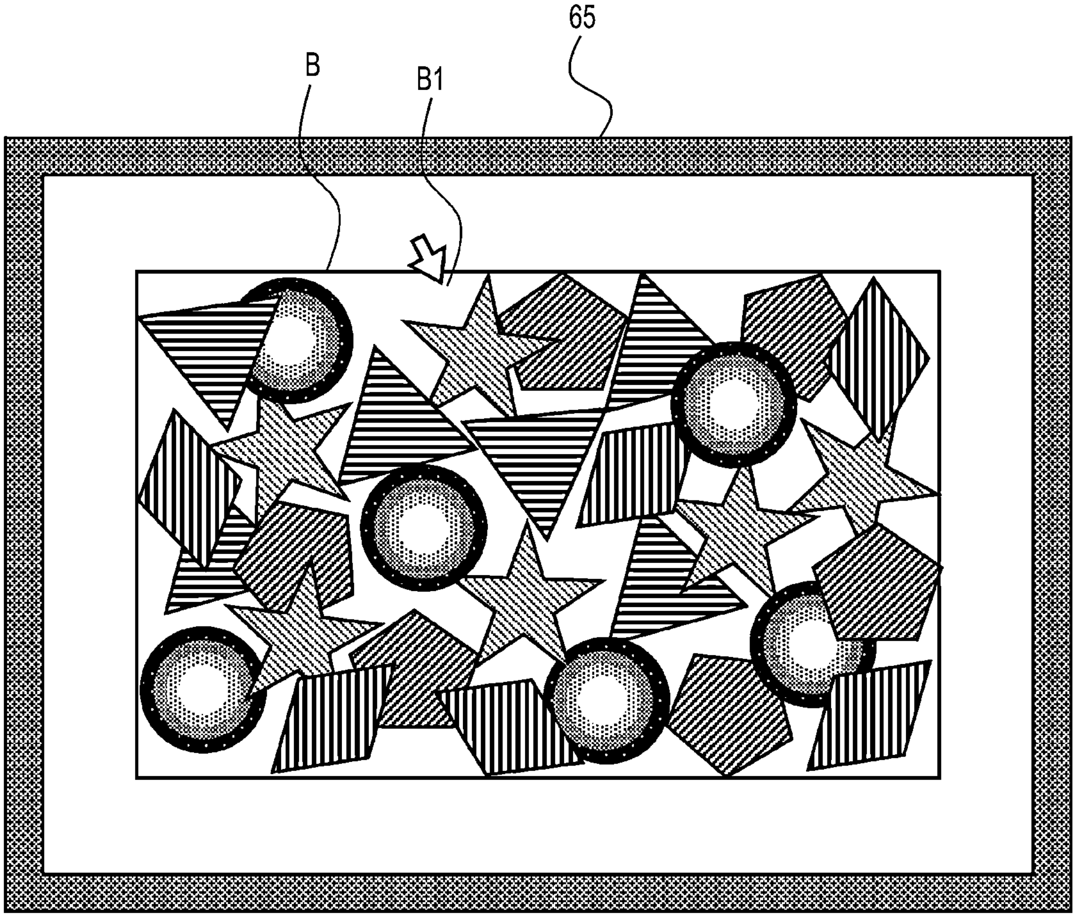
FIG. 8 is a schematic plan view illustrating the display device displaying the printing image.

According to a second determination method, as illustrated in the example of FIG. 8, the first control device 61 displays the printing image B on the display device 65 based on the image data thereof. Then, when the user designates a position in the displayed printing image B by the input device 64, the first control device 61 sets a pixel corresponding to the position designated by the user as a designated pixel, and acquires a color value of the designated pixel based on the image data. Then, the first control device 61 determines that pixels having the same color value as the color value of the designated pixel are the first pixel, and pixels having other color values are the second pixel based on the image data. The pixel designated by the user may be one or more pixels.

According to the second determination method, the first control device 61 may determine that among the pixels having the color value of the pixel designated by the user in the printing image B, pixels continuous with the designated pixel are the first pixel, and pixels not continuous with the designated pixel are the second pixel. Accordingly, even in a case where a pixel having the same color value as the color value of the designated pixel is included in the second pixel, when the pixel is not continuous with the designated pixel, the pixel is not determined as the first pixel but is determined as the second pixel. Therefore, the pixel having the same color as the first pixel in the second pixel is distinguished from the first pixel.

Further, according to a third determination method, for example, the image data of the printing image B includes first layer data defining a position and a color value of a background pixel and second layer data defining a position and a color value of an image pixel. In this case, the pixel defined in the first layer data based on a name or an ID of the layer data is set as the first pixel in advance, or is designated by the user. Accordingly, the first control device 61 determines that the pixel defined in the first layer data is the first pixel, and the pixel defined in the second layer data is the second pixel in the printing image B. Further, the first control device 61 acquires the color value of the pixel defined in the first layer data as a color value of the first image portion B1. The color value of the first image portion B1 may be one or more color values.

Therefore, the first pixel is determined by, for example, the first determination method to the third determination method. When the first pixel has the predetermined color value as in the first determination method, the first region A1 corresponding to the first pixel corresponds to the predetermined region. When the first pixel is the pixel designated by the user as in the second determination method, the first region A1 corresponding to the first pixel corresponds to the region designated by the user. Further, when the first layer data is set to the data in which the first pixel is defined in advance as in the third determination method, the first region A1 corresponding to the first pixel corresponds to the predetermined region. In addition, when the first layer data is designated by the user as the data in which the first pixel is defined as in the third determination method, the first region A1 corresponding to the first pixel corresponds to the region designated by the user.

The color value of the first pixel determined by the first determination method to the third determination method may include the color value of the first ink and not include other color values. In this case, as illustrated in the examples of FIGS. 7A and 7B, the first region A1 corresponding to the first pixel corresponds to the region where the second ink is not ejected. Therefore, the first layer C1 formed by using the first ink is formed, and the second layer C2 formed by using the second ink is not formed in the first region A1.

Further, the color value of the first pixel determined by the first determination method to the third determination method may not include the color value of the first ink but include other color values. In this case, as illustrated in the examples of FIG. 7C and FIG. 7D, the first ink and the second ink are ejected to the first region A1 corresponding to the first pixel. Therefore, the second layer C2 formed by using the second ink is formed on the first layer C1 formed by using the first ink in the first region A1.

Generation Process of Printing Data

The first control device 61 of the image processing device 11 converts the image data of the printing image B into the printing data printable by the output device 12. For example, when the color value of the pixel in the image data is defined by the RGB value, the first control device 61 executes a color conversion process for converting the color value from the RGB value to the color value corresponding to the type of the ink included in the output device 12, for example, a CMYKW value. The RGB value is represented by, for example, respective gradation values of 0 to 255 representing 256 gradations of red, green, and blue in an RGB color space. The CMYKW value is represented by, for example, respective gradation values of 0 to 100% representing 101 gradations of cyan, magenta, yellow, black, and white in a CMYKW color space. Although a case where the color value of the first ink as the undercoat ink is white will be described below, the color value of the undercoat ink is not limited thereto.

According to a first color conversion process, the first control device 61 uses a first LUT illustrated in the example of FIG. 9A to convert the RGB value in the image data of the printing image B into the CMYK value. The first LUT is a color conversion look-up table in which the RGB value and the CMYK value are associated with each other, and is stored in the first storage device 62. Then, regarding each pixel of the printing image B, the first control device 61 determines whether the pixel is the first pixel or the second pixel based on the image data.

Here, when the printing operation is the first printing operation, the first control device 61 acquires a predetermined W value for the first pixel such that the ejection amount of the white ink with respect to the first region A1 becomes the first predetermined amount, and acquires a CMYKW value of the first pixel by collectively using the W value and the CMYK value. Further, the first control device 61 acquires a predetermined W value for the second pixel such that the ejection amount of the white ink with respect to the second region A2 becomes the second predetermined amount, and acquires a CMYKW value of the second pixel by collectively using the W value, the CMYK value, and the second pixel. Then, the first control device 61 combines the CMYKW value of the first pixel and the CMYKW value of the second pixel to acquire the pixel data of the printing image B.

Further, when the printing operation is the second printing operation, the first control device 61 acquires a predetermined W value for the first pixel such that the ejection amount of the white ink with respect to the first region A1 becomes the third predetermined amount, and acquires a CMYKW value of the first pixel by collectively using the W value and the CMYK value. Further, the first control device 61 acquires a predetermined W value for the second pixel such that the ejection amount of the white ink with respect to the second region A2 becomes the fourth predetermined amount, and acquires a CMYKW value of the second pixel by collectively using the W value and the CMYK value. Then, the first control device 61 combines the CMYKW value of the first pixel and the CMYKW values of the second pixel to acquire the pixel data of the printing image B.

The color conversion process of the image data is not limited to the first color conversion process described above. For example, the first control device 61 may perform a second color conversion process using a second LUT illustrated in the example of FIG. 9B and a third LUT illustrated in the example of FIG. 9C. Hereinafter, a case where the first predetermined amount, the second predetermined amount, and the fourth predetermined amount are equal to one another, and the third predetermined amount is larger than the first predetermined amount, the second predetermined amount, and the fourth predetermined amount will be described.

The second LUT and the third LUT are color conversion look-up tables in which the RGB value and the CMYKW value are associated with each other, and are stored in the first storage device 62. In the second LUT and the third LUT, for example, white is set as the color of the first image portion B1. In this case, the W value corresponding to the RGB value (255, 255, 255) representing white as the color of the first image portion B1 is 80 in the second LUT, and 100 in the third LUT. On the other hand, CMYKW values corresponding to RGB values other than the RGB value (255, 255, 255) are equal to that in the second LUT and the third LUT. In the second LUT, the W values corresponding to all the RGB values are equal and are 80. On the other hand, in the third LUT, the W value corresponding to the RGB value representing white as the color of the first image portion B1 is 100, which is larger than 80 of the W values corresponding to all of other RGB values.

Here, when the printing operation is the first printing operation, the first control device 61 uses the second LUT illustrated in the example of FIG. 9B to convert the RGB value in the image data of the printing image B into the CMYKW value, and acquire the CMYKW value as the CMYKW value of the pixel data of the printing image B. Further, when the printing operation is the second printing operation, the first control device 61 uses the third LUT illustrated in the example of FIG. 9C to convert the RGB value in the image data of the printing image B into the CMYKW value, and acquire the CMYKW value as the CMYKW value of the pixel data of the printing image B. According to the CMYKW value, the W value corresponding to the first pixel is larger than the W value corresponding to the second pixel.

When the printing operation is the second printing operation in the second color conversion process, regarding each pixel of the printing image B, the first control device 61 may determine whether the pixel is the second pixel or the first pixel based on the image data. In this case, the first control device 61 converts the RGB value of the second pixel into the CMYKW value by using the second LUT for the second pixel, and converts the RGB value of the second pixel into the CMYKW value by using the third LUT for the first pixel. Then, the first control device 61 acquires the CMYKW value of the pixel data of the printing image B by collectively using the CMYKW value of the first pixel and the CMYKW value of the second pixel.

Therefore, by determining whether the pixel is the first pixel or the second pixel for each pixel, the pixel having the same color as the first pixel can be converted into the CMYKW value of the second pixel even when the pixel having the same color is included in the second pixel.

When the color conversion process is performed in this manner, the first control device 61 executes a halftone process for converting the CMYKW value of the pixel data of the printing image B into data of the gradation value that can be formed by the output device 12. Since this gradation value corresponds to the ejection amount of the ink, the ejection amount of the ink is defined for each pixel and each type of ink based on halftone data. The ejection amount of the ink increases as each color value of the CMYKW value increases. Here, a C value corresponds to an amount of the cyan ink ejected from the second nozzles 26 of the second head 22*c* to the unit region of the printing medium A. An M value corresponds to an amount of the magenta ink ejected from the second nozzles 26 of the second head 22*m* to the unit region of the printing medium A. A Y value corresponds to an amount of the yellow ink ejected from the second nozzles 26 of the second head 22*y* to the unit region of the printing medium A. A K value corresponds to an amount of the black ink ejected from the second nozzles 26 of the second head 22*k* to the unit region of the printing medium A. The W value corresponds to the amount of the white ink ejected from the first nozzles 25 of the first heads 21 to the unit region of the printing medium A.

Then, the first control device 61 executes a rasterization process for rearranging the halftone data of the pixels arranged in a grid pattern in the printing image B according to an ink ejection order. According to the rasterization process, the halftone data is allocated to the pass process for ejecting the inks while the heads 21 and 22 are moving, and then is allocated to the nozzles 25 and 26 for ejecting the inks in the pass process.

Then, the first control device 61 executes a command addition process for adding command data corresponding to the printing operation to the data subjected to the rasterization process. Examples of the command data include a transport amount and a transport speed of the printing medium A, and data for controlling a movement speed of the carriage 31. Therefore, when the first control device 61 generates the printing data, the first control device 61 transmits the printing data from the first communication interface 63 to the second control device 50 via the second communication interface 52 of the output device 12. The output device 12 executes the printing operation for printing the printing image B on the printing medium A based on the printing data.

Control Method For Printing Apparatus

Figure 10:
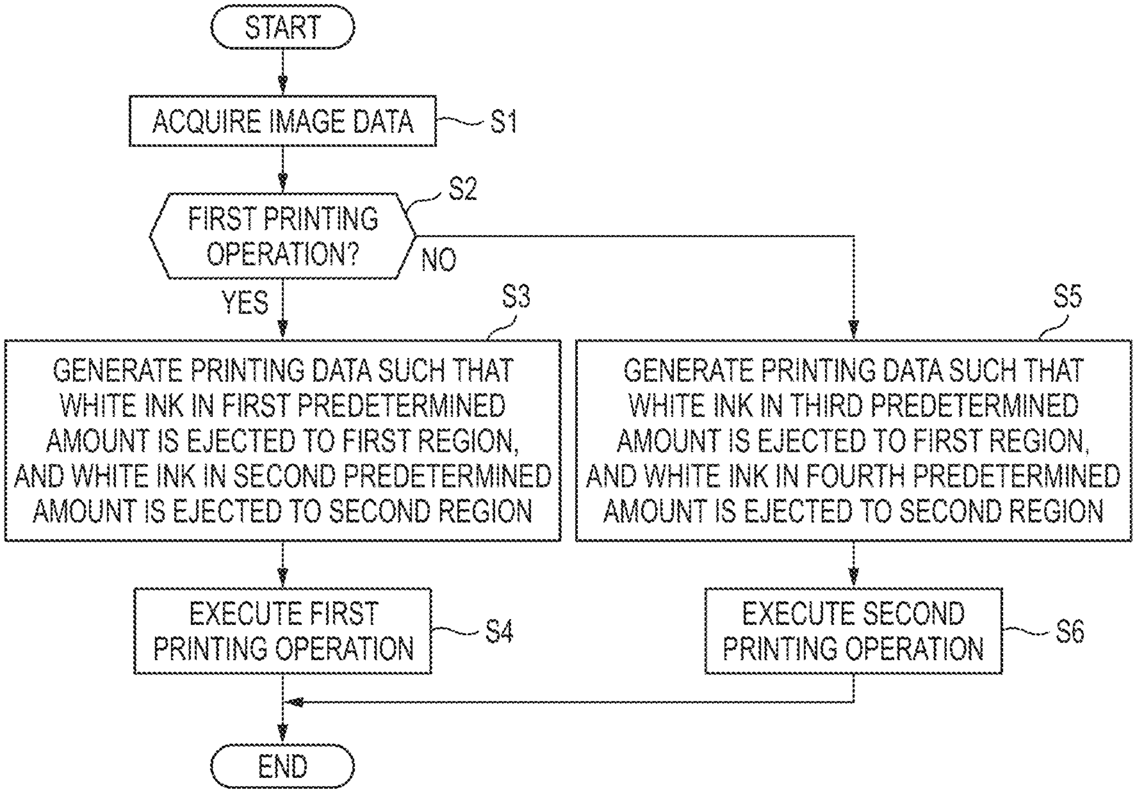
FIG. 10 is a flowchart illustrating a control method for the printing apparatus.

A control method for the printing apparatus 10 is executed by the control device 13 with reference to a flowchart illustrated in the example of FIG. 10. The control method for the printing apparatus 10 may be executed by the output device 12.

The first control device 61 of the image processing device 11 acquires the image data of the printing image B, which is an image to be printed on the printing medium A, from the first storage device 62, the first communication interface 63, or the like (step S1). Subsequently, the first control device 61 determines whether the printing operation of the printing image B is the first printing operation or the second printing operation (step S2). Here, for example, the first control device 61 displays, on the display device 65, the setting screen for the printing operation illustrated in the example of FIG. 4. When the user sets the printing operation by using the input device 64, the set printing operation is input to the first control device 61.

If the printing operation is the first printing operation (step S2: YES), the first control device 61 generates the printing data based on the image data such that the white ink in the first predetermined amount is ejected to the first region A1, and the white ink in the second predetermined amount is ejected to the second region A2 (step S3). Here, for example, as described above, the first control device 61 executes the color conversion process on the image data of the printing image B by using the LUT illustrated in the example of FIG. 9A or FIG. 9B to acquire the CMYKW value, further executes the halftone process, the rasterization process, the command addition process, and the like, generates the printing data of the printing image B, and transmits the printing data to the output device 12.

When acquiring the printing data of the printing image B from the image processing device 11, the second control device 50 of the output device 12 executes the first printing operation based on the printing data (step S4). According to the first printing operation, the second control device 50 executes the pass process of the first heads 21 and the transport process of the printing medium A. Here, the ink may be ejected to the unit region of the printing medium A by performing the pass process once or a plurality of times.

In the pass process according to the first printing operation, the white ink in the first predetermined amount is ejected from the first heads 21 to the first region A1, and the white ink in the second predetermined amount is ejected to the second region A2 while the first heads 21 are moved leftward or rightward. Accordingly, the first layer C1 formed by using the white ink and having the first thickness D1 is formed in the first region A1, and the first layer C1 formed by using the white ink and having the second thickness D2 is formed in the second region A2. Then, by ejecting the color ink from the second heads 22 to the first region A1 and the second region A2 or to only the second region A2 while the second heads 22 are moved leftward or rightward, the second layer C2 formed by using the color ink and having the thickness DO is formed on the first layer C1.

On the other hand, if the printing operation is the second printing operation (step S2: NO), the first control device 61 generates the printing data based on the image data such that the white ink in the third predetermined amount is ejected to the first region A1, and the white ink in the fourth predetermined amount is ejected to the second region A2 (step S5). Here, for example, as described above, the first control device 61 executes the color conversion process on the image data of the printing image B by using the LUT illustrated in the example of FIG. 9A or FIG. 9C to acquire the CMYKW value, further executes the halftone process, the rasterization process, the command addition process, and the like, generates the printing data of the printing image B, and transmits the printing data to the output device 12.

When acquiring the printing data of the printing image B from the image processing device 11, the second control device 50 of the output device 12 executes the second printing operation based on the printing data (step S6). According to the second printing operation, the second control device 50 executes the pass process of the first head 21 and the transport process of the printing medium A. Here, the ink may be ejected to the unit region of the printing medium A by performing the pass process once or a plurality of times.

In the pass process according to the second printing operation, the white ink in the third predetermined amount is ejected from the first heads 21 to the first region A1, and the white ink in the fourth predetermined amount is ejected to the second region A2 while the first heads 21 are moved leftward or rightward. Accordingly, the first layer C1 formed by using the white ink and having the third thickness D3 is formed in the first region A1, and the first layer C1 formed by using the white ink and having the fourth thickness D4 is formed in the second region A2. Then, by ejecting the color ink from the second heads 22 to the first region A1 and the second region A2 or to only the second region A2 while the second heads 22 are moved leftward or rightward, the second layer C2 formed by using the color ink and having the thickness DO is formed on the first layer C1.

When the third predetermined amount is larger than the first predetermined amount, the amount of the white ink forming the first layer C1 in the first region A1 is larger in the second printing operation than that in the first printing operation. Therefore, the coloring of the first image portion B1 in the first region A1 can be further improved by the second printing operation. On the other hand, according to the first printing operation, it is possible to restrain the consumption of the ink for printing on the printing image B.

In addition, for example, when the fourth predetermined amount is smaller than the second predetermined amount, the bleeding of the white ink in the small fourth predetermined amount and the color ink ejected onto the white ink is reduced. Accordingly, the coloring of the second image portion B2 as the second layer C2 formed by using the color ink in the second region A2 can be further improved by the second printing operation.

According to the printing operations in step S4 and S6, the output device 12 may cause the white ink to be ejected to the first region A1 and the second region A2, and then cause the color ink to be ejected onto the first layer C1 formed by using the white ink in the second printing operation. Further, the output device 12 may cause the white ink to be ejected to the first region A1, cause the color ink to be ejected onto the first layer C1 formed by using the white ink, and then cause the white ink to be ejected to the second region A2 in the second printing operation.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

In the printing apparatus 10 according to Modification 1, when the control device 13 causes the first ink to be ejected as the first liquid and causes the second ink to be ejected as the second liquid in the second printing operation according to the embodiment described above, the control device 13 causes the first ink to be ejected in an amount between the third predetermined amount and the fourth predetermined amount to an approximate color region A3 printed in an approximate color having a color value within a predetermined range with respect to the color of the first ink in the printing medium A.

Figure 11A:
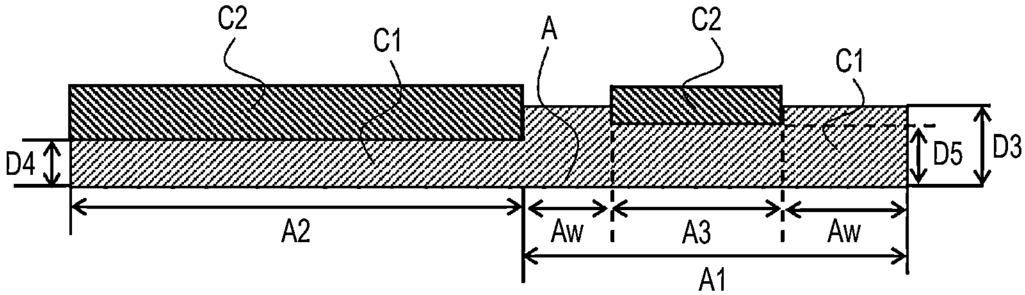
FIG. 11A is a cross-sectional view that illustrates the printing medium including an approximate color region of the first region.
Figure 11B:
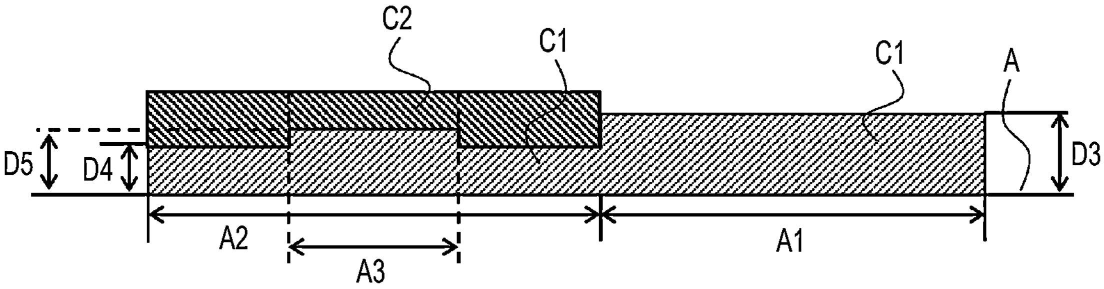
FIG. 11B is a cross-sectional view that illustrates the printing medium including the approximate color region of the second region.

Specifically, as illustrated in the examples of FIGS. 11A and 11B, when the first ink is the white ink, a pixel having the color value of the approximate color with respect to the color value of the white ink may exist in the printing image B. A color difference ΔE between the color value of the approximate color and the color value of the white ink is within a predetermined range. The color difference ΔE is the length of a perpendicular line drawn from the color value of the white ink onto a printing color gamut which is a region of the color value printable by the output device 12 in a predetermined color space, for example, a L*a*b* color space. Alternatively, the color difference ΔE is the shortest length among lengths between the color value of the white ink and the printing color gamut in the L*a*b* color space.

The example of FIG. 11A is a case where the first pixel of the printing image B includes a white pixel and an approximate color pixel. In this case, the first region A1 where the first pixel is printed includes white regions Aw where the first pixel in white is printed, and the approximate color region A3 where the first pixel in the approximate color is printed. In this case, according to the second printing operation, the white ink in the third predetermined amount is ejected to the white regions Aw, and the white ink in an intermediate amount, which is the amount between the third predetermined amount and the fourth predetermined amount, is ejected to the approximate color region A3.

In this case, the first control device 61 performs the color conversion process of the image data of the printing image B by using the fourth LUT illustrated in the example of FIG. 9D in the second printing operation. The fourth LUT is a color conversion look-up table in which the RGB value and the CMYKW value are associated with each other, and is stored in the first storage device 62. In the fourth LUT, for example, white and the approximate color thereof are set as the color of the first image portion B1. The fourth LUT differs from the third LUT in a W value corresponding to a RGB value (255, 255, 240) representing the approximate colors, but otherwise is the same as the third LUT. The W value of the approximate color is 90, and is smaller than 100 of the W value corresponding to the RGB value representing white: (255, 255, 255), and larger than 80 of the W value of color values other than white and the approximate color.

The ejection amount of the ink to the printing medium A in the printing operation increases as the W value increases. Therefore, when the output device 12 executes the second printing operation based on the printing data in which the image data of the printing image B is subjected to the color conversion based on the fourth LUT, the white ink is ejected from the first heads 21 to the printing medium A. In the first region A1 corresponding to the first pixel in the printing medium A, the white ink in the third predetermined amount corresponding to the W value: 100 is ejected to the white regions Aw, and the white ink in the intermediate amount corresponding to the W value: 90 is ejected to the approximate color region A3. In addition, the white ink in the fourth predetermined amount corresponding to the W value: 80 is ejected to the second region A2 corresponding to the second pixel. Therefore, the first layer C1 having the third thickness D3 is formed in the white regions Aw, the first layer C1 having a fifth thickness D5 is formed in the approximate color region A3, and the first layer C1 having the fourth thickness D4 is formed in the second region A2. Then, the color ink is ejected to onto the first layer C1 in the approximate color region A3 of the first region A1 and the second region A2. Accordingly, the second layer C2 formed by using the color ink is formed on the first layer C1 formed by using the white ink in the approximate color region A3 of the first region A1 and the second region A2. Even when the amount of the color ink for the second layer C2 in the approximate color region A3 is smaller than that in the second region A2, the amount of the white ink for the first layer C1 in the approximate color region A3 is larger than that in the second region A2. Therefore, the coloring of the first image portion B1 in the approximate color region A3 can be improved by the second printing operation. In addition, the fifth thickness D5 of the first layer C1 in the approximate color region A3 is smaller than the third thickness D3 of the first layer C1 in the white regions Aw, and is larger than the fourth thickness D4 of the first layer C1 in the second region A2. Therefore, as compared to a case where the thickness of the first layer C1 formed by using the white ink in the approximate color region A3 is the third thickness D3 or the fourth thickness D4, the conspicuousness due to differences between the thickness of the first layer C1 formed by using the white ink in the approximate color region A3 and the third thickness D3 of the first layer C1 formed by using the white ink in the first region A1 and the fourth thickness D4 of the first layer C1 formed by using the white ink in the second region A2 is restrained.

The example of FIG. 11B is a case where the second pixel of the printing image B includes a pixel in the approximate color with respect to the color of the white ink. The second region A2 where the second pixel is printed includes the approximate color region A3 where the second pixel in the approximate color is printed, and other color regions where the second pixel in colors other than the approximate color is printed. In this case, the first control device 61 performs the color conversion process of the image data of the printing image B by using the fourth LUT illustrated in the example of FIG. 9D in the second printing operation. When the output device 12 executes the second printing operation based on the printing data subjected to the color conversion, the ink in the fourth predetermined amount corresponding to the W value: 100 is ejected to the first region A1 of the printing medium A, the ink in the fourth predetermined amount corresponding to the W value: 80 is ejected to the other color regions in the second region A2, and the ink in the intermediate amount corresponding to the W value: 90 is ejected to the approximate color region A3. Then, the color ink is ejected to the second region A2. Therefore, the first layer C1 having the third thickness D3 is formed in the first region A1, the first layer C1 having the fifth thickness D5 is formed in the approximate color region A3, and the first layer C1 having the fourth thickness D4 is formed in the other color regions of the second region A2. Then, the color ink is ejected onto the first layer C1 in the second region A2.

Accordingly, the second layer C2 formed by using the color ink is formed on the first layer C1 formed by using the white ink in the approximate color region A3. Even when the amount of the color ink for the second layer C2 in the approximate color region A3 is smaller than that in the other color regions, the amount of the white ink for the first layer C1 in the approximate color region A3 is larger than that in the other color regions. Therefore, the coloring of the second image portion B2 in the approximate color region A3 can be improved.

Modification 2

In the printing apparatus 10 according to Modification 2, when the control device 13 causes the first ink to be ejected as the first liquid and causes the second ink to be ejected as the second liquid in the second printing operation according to the embodiment described above and Modification 1, the control device 13 causes the first ink to be ejected in an amount smaller than the fourth predetermined amount to a region adjacent to the second region A2 in the first region A1 or a region adjacent to the first region A1 in the second region A2.

Figure 11C:
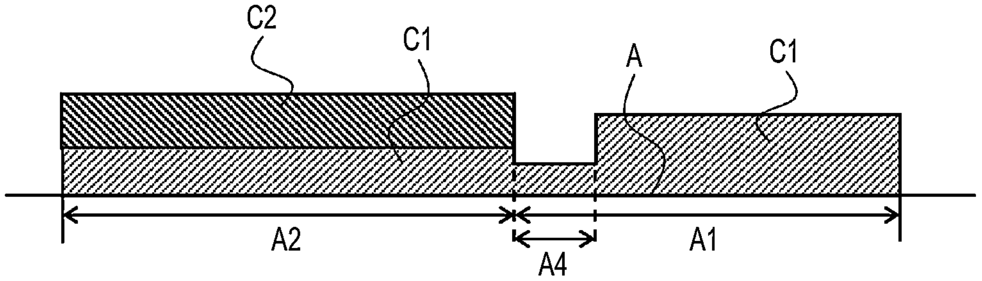
FIG. 11C is a cross-sectional view that illustrates the printing medium including an adjacent region of the first region.

Specifically, as illustrated in the example of FIG. 11C, the first region A1 of the printing medium A has an adjacent region A4 adjacent to the second region A2. The adjacent region A4 is a range of the printing medium A from a boundary between the first region A1 and the second region A2 to a predetermined distance in the first region A1.

In this case, the first pixel of the printing image B printed in the first region A1 includes an adjacent pixel printed in the adjacent region A4 and a pixel printed outside the adjacent region A4. The adjacent pixel may include, in addition to the first pixel directly adjacent to the second pixel, the first pixel indirectly adjacent to the second pixel through one or more first pixels in a direction away from a boundary between the first pixel and the second pixel.

For example, the first control device 61 performs the color conversion process of the image data of the printing image B by using the third LUT illustrated in the example of FIG. 9C in the second printing operation. Therefore, the W value of the first pixel is converted to 90, and the W value of the second pixel is converted to 80. Then, the first control device 61 converts the W value of the adjacent pixel included in the first pixel into, for example, 70 smaller than the W value of the second pixel. Therefore, according to the second printing operation, the white ink in an amount corresponding to the W value: 70 is ejected to the adjacent region A4 corresponding to the adjacent pixel, the white ink in the third predetermined amount corresponding to the W value: 100 is ejected to the first region A1 outside the adjacent region A4, and the ink in the fourth predetermined amount corresponding to the W value: 80 is ejected to the second region A2 corresponding to the second pixel. Then, the color ink is ejected to the second region A2.

For example, when the white ink is ejected to the first region A1 in an amount more than that in the second region A2, the color ink in the second region A2 may easily bleed to the first region A1. On the other hand, by setting the ejection amount of the white ink in the adjacent region A4 adjacent to the second region A2 in the first region A1 to be smaller than the fourth predetermined amount in the second region A2, the bleeding of the color ink can be reduced. Therefore, the coloring of the first image portion B1 in the first region A1 can be further improved.

Figure 11D:
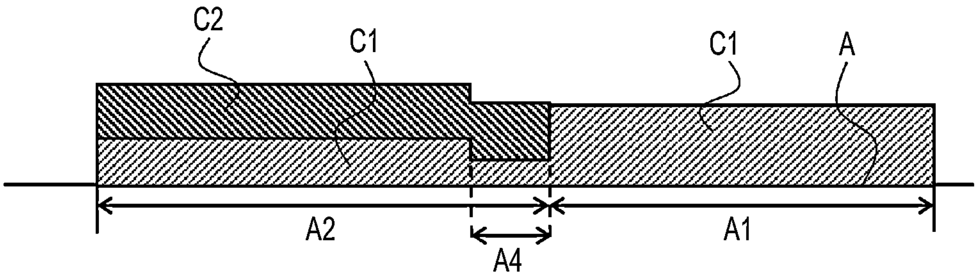
FIG. 11D is a cross-sectional view that illustrates the printing medium including the adjacent region of the second region.
Figures 12A, 12B, 12C, 12D:
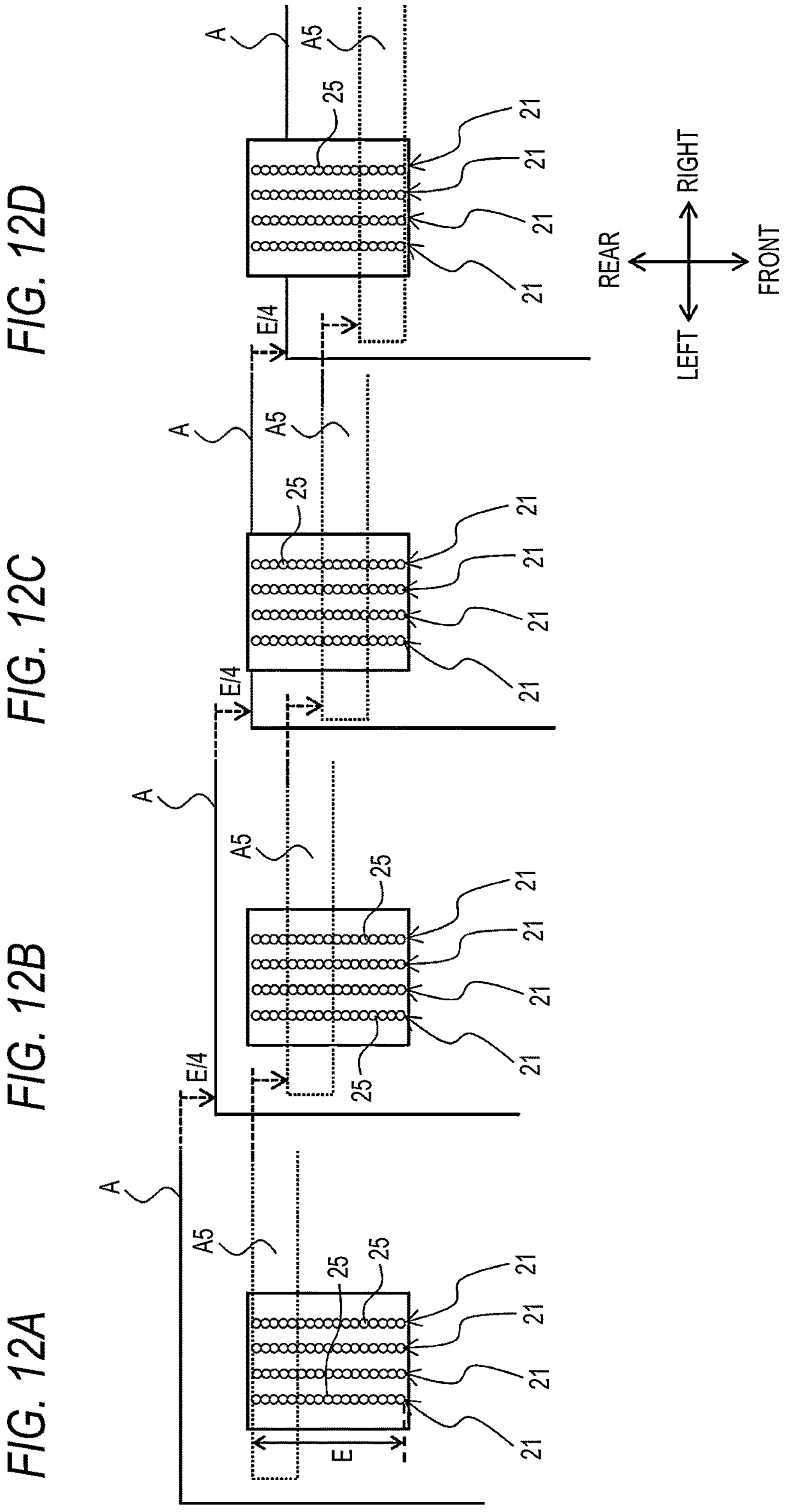
FIG. 12A is a diagram illustrating a first pass process of duplicate printing.
FIG. 12B is a diagram illustrating a second pass process of the duplicate printing.
FIG. 12C is a diagram illustrating a third pass process of the duplicate printing.
FIG. 12D is a diagram illustrating a fourth pass process of the duplicate printing.
Figures 13A, 13B, 13C, 13D, 13E:
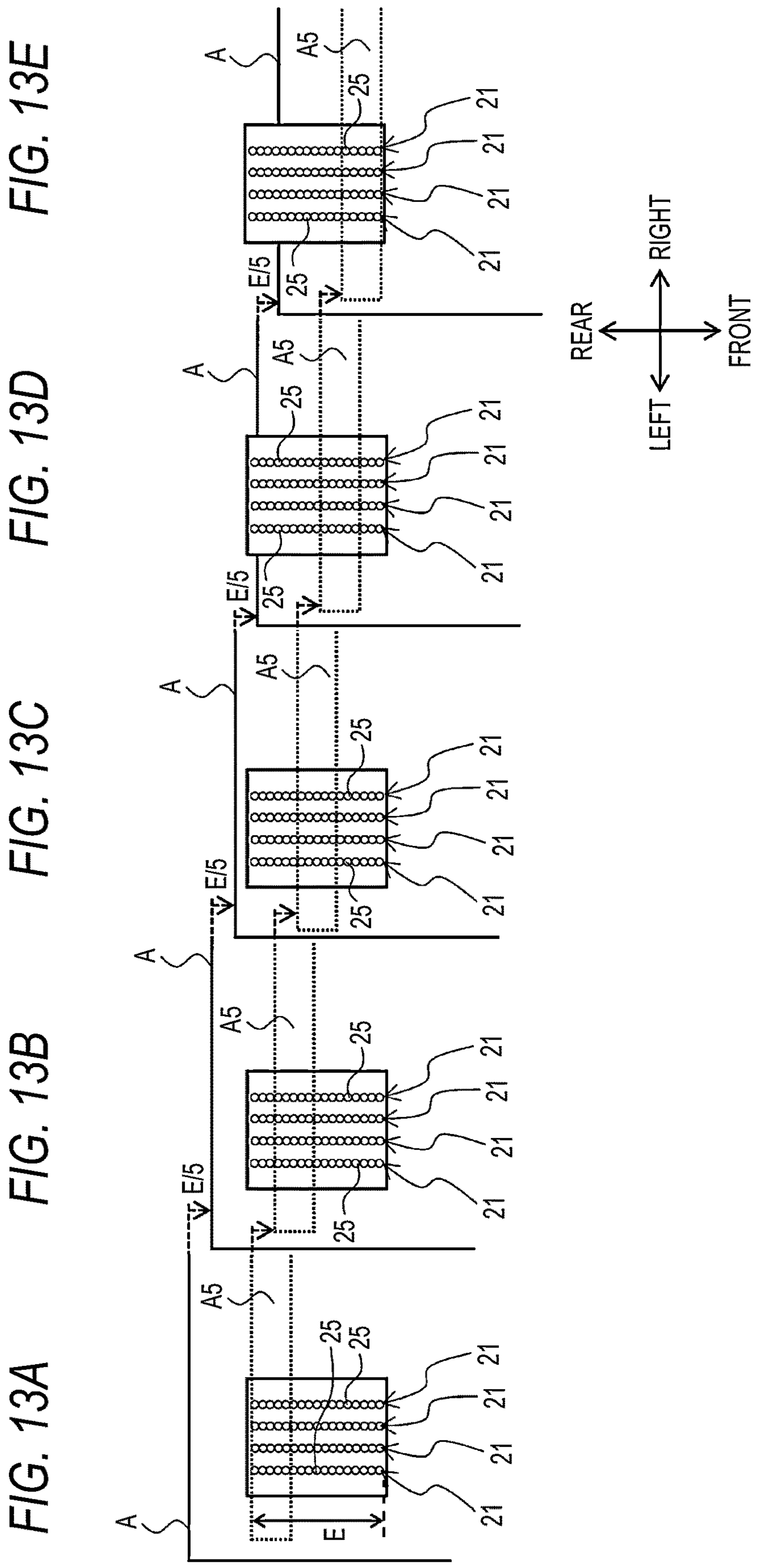
FIG. 13A is a diagram illustrating the first pass process of the duplicate printing.
FIG. 13B is a diagram illustrating the second pass process of the duplicate printing.
FIG. 13C is a diagram illustrating the third pass process of the duplicate printing.
FIG. 13D is a diagram illustrating the fourth pass process of the duplicate printing.
FIG. 13E is a diagram illustrating a fifth pass process of the duplicate printing.

In addition, as illustrated in the example of FIG. 11D, the second region A2 of the printing medium A may have the adjacent region A4 adjacent to the first region A1. The adjacent region A4 is a range of the printing medium A from the boundary between the first region A1 and the second region A2 to a predetermined distance in the second region A2.

Also in this case, similarly to the adjacent region A4 in the first region A1, according to the second printing operation, the white ink in the third predetermined amount is ejected to the first region A1 corresponding to the first pixel, the white ink in the fourth predetermined amount is ejected to the outside of the adjacent region A4 in the second region A2, and the white ink in the amount smaller than the fourth predetermined amount is ejected to the adjacent region A4. Accordingly, even when the white ink is ejected to the first region A1 in a large amount, the ejection amount of the white ink in the adjacent region A4 adjacent to the first region A1 in the second region A2 is small. Therefore, it is possible to reduce the bleeding of the white ink to the second region A2. Therefore, the coloring of the second image portion B2 in the second region A2 can be further improved.

Modification 3

The printing apparatus 10 according to Modification 3 includes the carriage 31 for reciprocating the first heads 21 along the first direction in the embodiment described above and Modifications 1 to 2. Each of the first heads 21 includes the plurality of first nozzles 25 configured to allow the first ink to be ejected therefrom as the first liquid. When executing the first printing operation, the control device 13 causes the first ink in the first predetermined amount to be ejected to the first region A1 by ejecting the first ink in a first amount from each of the first nozzles 25 of the predetermined number in each of the first heads 21 while reciprocating the first heads 21 about the first number of times. When executing the second printing operation, the control device 13 causes the first ink in the third predetermined amount to be ejected to the first region A1 by ejecting the first ink in the first amount from each of the first nozzles 25 in the first head 21, the number of the first nozzles 25 being larger than the predetermined number, or by ejecting the first ink in an amount larger than the first amount from each of the first nozzles 25 of the predetermined number of first nozzles 25 in the first head 21, or by ejecting the first ink in the amount larger than the first amount from each of the first nozzles 25 in the first head 21, the number of the first nozzles 25 being larger than the predetermined number while reciprocating the first heads 21 about the first number of times.

Specifically, as illustrated in the example of FIG. 2, the first heads 21 are the four first heads 21 aligned in the left-right direction, and each of the first heads 21 includes the plurality of first nozzles 25 aligned in the front-rear direction. Therefore, by increasing the number of the first heads 21 that eject the white ink as the first ink, the number of the first nozzles 25 ejecting the white ink from the first heads 21 to the unit region of the printing medium A increases, and the ejection amount of the white ink from the first heads 21 to the unit region of the printing medium A can be increased.

Each of the first nozzles 25 is capable of ejecting ink droplets which are a plurality of types of liquid droplets different in amount. For example, each of the first nozzles 25 can eject, by one ejection operation, the white ink in the forms of a medium-sized droplet, which is an ink droplet in a predetermined amount, a small-sized droplet, which is an ink droplet in an amount smaller than the predetermined amount, and a large-sized droplet, which is an ink droplet in an amount larger than the predetermined amount. In this case, it is possible to increase the ejection amount of the white ink from the first heads 21 to the unit region of the printing medium A by increasing the amount of the ink droplets ejected from one first nozzle 25 by one ejection operation in the forms of the small-sized droplet, the medium-sized droplet, and the large-sized droplet.

In this printing apparatus 10, for example, in the pass process of the first printing operation, the first heads 21 are moved the first number of times such as once or a plurality of times (four times in the examples of FIGS. 12A to 12D). During the movement, the white ink is ejected from all the first nozzles 25 of the predetermined number of first heads 21, for example, one first head 21. At this time, the ink droplet in a first amount, for example, in the form of the medium-sized droplet, is ejected from each of the first nozzles 25. Then, in the transport process of the first printing operation, the printing apparatus 10 transports the printing medium A forward by a length E/4, that is, a quarter of the length E of the first head 21 in the front-rear direction.

The printing apparatus 10 repeats the pass process and the transport process. Accordingly, in a region A5 in the printing medium A, the white ink is ejected from the first to fifth first nozzles 25 of each of the first heads 21 according to a first pass process in the example of FIG. 12A, the white ink is ejected from the sixth to tenth first nozzles 25 of each of the first heads 21 according to a second pass process in the example of FIG. 12B, the white ink is ejected from the eleventh to fifteenth first nozzles 25 of each of the first heads 21 according to a third pass process in the example of FIG. 12C, and the white ink is ejected from the sixteenth to twentieth first nozzles 25 of each of the first heads 21 according to a fourth pass process in the example of FIG. 12D. Accordingly, the first layer C1 formed by using the white ink is duplicatively printed in the printing medium A by the plurality of pass processes. The total amount acquired by summing up the amount of the white ink ejected to the unit region of the first region A1 by each of the first pass process to the fourth pass process is the first predetermined amount.

In addition, in the pass process of the second printing operation, the printing apparatus 10 moves the first heads 21 the same first number of times as in the first printing operation. During this movement, the number of the first nozzles 25 that eject the white ink, or the amount of the ink droplets of the white ink ejected from each of the first nozzles 25, or both the number of the first nozzles 25 and the amount of the ink droplets are increased as compared with the first printing operation. The amount of the white ink ejected to the unit region of the first region A1 by the second printing operation is larger than the first predetermined amount in the first printing operation, and is the third predetermined amount. Accordingly, since the number of the pass processes is not increased, the ejection amount of the white ink can be increased without prolonging a printing time.

Modification 4

The printing apparatus 10 according to Modification 4 includes the carriage 31 for reciprocating the first heads 21 along the first direction in the embodiment described above and Modifications 1 to 3. When executing the first printing operation, the control device 13 causes the first ink as the first liquid in the first predetermined amount to be ejected to the first region A1 from the first heads 21 while reciprocating the first heads 21 about the first number of times. When executing the second printing operation, the control device 13 causes the first ink in the third predetermined amount to be ejected to the first region A1 from the first heads 21 while reciprocating the first heads 21 more than the first number of times.

Specifically, as illustrated in the example of FIG. 4, the first control device 61 displays, on the display device 65, the setting screen for setting the amount of the white ink in the first region A1 in the second printing operation. The amount of the white ink may be set only when the second printing operation is set as the printing operation. When the user sets the amount of the white ink (a setting amount) by using the input device 64, the first control device 61 generates the printing data for the second printing operation according to the setting amount. At this time, the first control device 61 acquires the setting amount as the third predetermined amount which is the ejection amount of the white ink in the first region A1, and acquires the fourth predetermined amount according to the setting amount.

The setting amount is the amount of the white ink ejected to the unit region of the first region A1 in the second printing operation performed by the output device 12 when a maximum amount of the white ink (a head maximum amount) that can be ejected by one first head 21 is 100%. The head maximum amount is the amount of the white ink ejected to the unit region of the printing medium A when the ink droplets in the maximum amount (for example, the large-sized droplets) that can be ejected from each of the first heads 21 are ejected from all the first nozzles 25 of one first head 21 while the first heads 21 are moving rightward or leftward the first number of times. Therefore, in the case where the output device 12 includes the four first heads 21, it is possible to eject the white ink in an amount of up to 400%, which is four times the head maximum amount.

For example, when the setting amount set by the user is equal to or less than a predetermined threshold value (for example, 400% which is four times the head maximum amount), the first control device 61 executes the second printing operation as in Modification 3. At this time, the first control device 61 sets the first number of times of the movement of the first heads 21 in the first region A1 to be equal to that in the first printing operation, and changes at least one of the number of the first nozzles 25 for ejecting the white ink and the amount of the ink droplets according to the setting amount set by the user. Accordingly, the white ink in the setting amount as the third predetermined amount is ejected to the first region A1, and the white ink in the fourth predetermined amount according to the setting amount is ejected to the second region A2. Since the number of times of the pass process is not increased in the second printing operation as compared with the first printing operation, it is possible to reduce the prolonging of the printing operation.

On the other hand, when the setting amount set by the user exceeds the threshold value, the first control device 61 executes the second printing operation by setting the number of times of the movement of the first heads 21 to be larger than the first number of times in the first printing operation according to the setting amount set by the user. In addition to the number of times of the movement of the first heads 21, the first control device 61 may change at least one of the number of the first nozzles 25 for ejecting the white ink and the amount of the ink droplets according to the setting amount set by the user.

For example, in a case where the setting amount is 500%, that is, five times the head maximum amount and the white ink in the amount of 400% is ejected in the first printing operation, the number of times of the movement of the first heads 21 in the second printing operation is 1.25 times the first number of times in the first printing operation. In this case, in the transport process of the first printing operation, the printing medium A is transported forward by the length E/4, that is, a quarter of the length E of the first head 21 in the front-rear direction as illustrated in the examples of FIGS. 12A to 12D. On the other hand, in the transport process of the second printing operation, the printing medium A is transported forward by a length shorter than the length in the first printing operation, for example, by a length E/5, that is, one-fifth of the length E of the first head 21 in the front-rear direction as illustrated in the examples of FIGS. 13A to 13E.

Accordingly, in the first printing operation, the white ink is ejected to the region A5 in the printing medium A by the first pass process to the fourth pass process as illustrated in the examples of FIGS. 12A to 12D. On the other hand, in the second printing operation, the white ink is ejected to the region A5 in the printing medium A by the first pass process to a fifth pass process as illustrated in the examples of FIGS. 13A to 13E. Therefore, in the examples of FIGS. 13A to 13E, when the ink droplets in the form of the large-sized droplet are ejected from all the first nozzles 25, the white ink in the amount of 500% as the third predetermined amount, which is a product of the head maximum amount of 100%, the number of 4 of the first heads 21 for ejecting the white ink, and an increase rate of 5/4 of the number of times of the pass process, is ejected to the first region A1. Accordingly, by increasing the number of times of the pass process of the first heads 21, the white ink in an amount according to the user's intention is ejected, and the coloring of the first image portion B1 can be further improved by the second printing operation.

Modification 5

In the embodiment described above and Modifications 1 to 4, the first heads 21, which are inkjet heads, are used as the first ejection unit, and the second heads 22, which are inkjet heads, are used as the second ejection unit. However, the first ejection unit and the second ejection unit are not limited to the inkjet head. Both the first ejection unit and the second ejection unit may be coating mechanisms other than the inkjet head such as a spray, potting, doming, or a dispenser. In addition, one of the first ejection unit and the second ejection unit may be an inkjet head, and the other one thereof may be a coating mechanism other than the inkjet head such as a spray, potting, doming, or a dispenser.

Accordingly, it is possible to use an appropriate ejection unit according to the ejection amount and an ejection range of the liquid.

Other Modifications

In the embodiment described above and the modifications, the printing apparatus 10 ejects the first ink such as the white ink as the first liquid from the first heads 21 as the first ejection unit to the printing medium A, but the first liquid is not limited thereto. For example, the printing apparatus 10 may eject a pre-processing liquid as the first liquid from the first ejection unit to the printing medium A. In this case, the second liquid is a liquid ejected onto the first layer C1 formed by using the pre-processing liquid, and may be, for example, the first ink such as the white ink, the second ink such as the color ink, a post-processing liquid, or a combination thereof.

The pre-processing liquid is, for example, an aggregating liquid that aggregates particles in the ink. The pre-processing liquid is ejected to the printing medium A before the ink such as the white ink and the color ink is ejected to the printing medium A as the second liquid. Accordingly, the first layer C1 formed by using the pre-processing liquid is formed in the first region A1 and the second region A2 of the printing medium A, and the second layer C2 formed by using the second liquid is laminated on the first layer C1 in the second region A2. The second layer C2 may be a single layer formed by using, for example, the color ink, or may be a plurality of layers including an underlayer formed by using, for example, the white ink and an image layer formed by using, for example, the color ink and laminated on the underlayer.

According to the first printing operation, the pre-processing liquid in the first predetermined amount is ejected to the first region A1, and the pre-processing liquid in the second predetermined amount is ejected to the second region A2. According to the second printing operation, the pre-processing liquid in the third predetermined amount is ejected to the first region A1, and the pre-processing liquid in the fourth predetermined amount is ejected to the second region A2 such that the absolute value of the difference acquired by subtracting the fourth predetermined amount from the third predetermined amount is larger than the absolute value of the difference acquired by subtracting the second predetermined amount from the first predetermined amount. Accordingly, for example, when the third predetermined amount of the pre-processing liquid is larger than the first predetermined amount thereof, the coloring of the first image portion B1 by the ink ejected onto the first layer C1 formed by using the pre-processing liquid can be improved. In addition, when the fourth predetermined amount of the pre-processing liquid is smaller than the second predetermined amount thereof, the bleeding of the ink ejected onto the first layer C1 formed by using the pre-processing liquid can be reduced, and the coloring of the second image portion B2 can be improved. Accordingly, the printing apparatus 10 can eject the liquid in an appropriate amount corresponding to the region of the printing medium A.

In the embodiment described above and the modifications, the printing apparatus 10 ejects the first ink such as the white ink as the first liquid from the first heads 21 to the printing medium A, but the first liquid is not limited thereto. For example, the printing apparatus 10 may eject the post-processing liquid as the first liquid from the first heads 21 to the printing medium A. In this case, the second liquid may be a liquid ejected onto the first layer C1 formed by using the post-processing liquid.

The post-processing liquid is, for example, a coating liquid for protecting the layers formed by using the inks such as the white ink and the color ink. For example, when the first liquid is a first post-processing liquid and the second liquid is a second post-processing liquid, the first post-processing liquid as the first liquid is ejected to the first region A1 and the second region A2 of the printing medium A, and the first layer C1 is formed in the first region A1 and the second region A2. Further, the second post-processing liquid as the second liquid is ejected onto the first layer C1 in the second region A2, and the second layer C2 formed by using the second post-processing liquid is formed on the first layer C1. In this case, the layers formed by using the post-processing liquids are laminated. The second post-processing liquid as the second liquid may also be ejected to the first region A1. In addition, before ejecting the first post-processing liquid as the first liquid, the pre-processing liquid, the first ink such as the white ink, the second ink such as the color ink, or a combination thereof may be ejected to at least one of the first region A1 and the second region A2.

According to the first printing operation, the first post-processing liquid in the first predetermined amount is ejected to the first region A1, and the first post-processing liquid in the second predetermined amount is ejected to the second region A2. According to the second printing operation, the first post-processing liquid in the third predetermined amount is ejected to the first region A1, and the first post-processing liquid in the fourth predetermined amount is ejected onto the first layer C1 in the second region A2 such that the absolute value of the difference acquired by subtracting the fourth predetermined amount from the third predetermined amount is larger than the absolute value of the difference acquired by subtracting the second predetermined amount from the first predetermined amount. For example, when the third predetermined amount is larger than the first predetermined amount, a protection force due to the printing medium A or the like can be improved by the first layer C1 formed by using the first post-processing liquid. In addition, when the fourth predetermined amount is smaller than the second predetermined amount, a protection force due to the second post-processing liquid can be expected, and thus the amount of the first post-processing liquid can be reduced. Accordingly, the printing apparatus 10 can eject the liquid in an appropriate amount corresponding to the region of the printing medium A.

According to the third determination method in the embodiment described above and the modifications, the first control device 61 determines that the pixel defined in the first layer data is the first pixel in the printing image B. However, the first pixel may include an ejection pixel which is a pixel where the white ink is ejected, and a non-ejection pixel which is a pixel where the ink is not ejected. In this case, when color values of both the ejection pixel and the non-ejection pixel are represented by the RGB value: (255, 255, 255), these pixels are not distinguished. Here, the first control device 61 may set the color value of the non-ejection pixel to the RGB value: (255, 255, 255), and set the color value of the ejection pixel to an RGB value different from that of the color value of the non-ejection pixel, for example, (254, 254, 254). However, the color value of the ejection pixel is different from the white of the first pixel. Therefore, the first control device 61 sets the color value of the non-ejection pixel in the first layer data to the RGB value: (255, 255, 255), and sets the color value of the ejection pixel in the first layer data to an RGB value different from the color value of the non-ejection pixel, for example, (254, 254, 254). Then, when converting the RGB value: (255, 255, 255)

into a CMYKW value, the first control device 61 sets the W value to 0. Accordingly, the white ink is not ejected to the region of the printing medium A corresponding to the non-ejection pixel having the RGB value: (255, 255, 255). On the other hand, when converting the RGB value: (254, 254, 254) to a CMYKW value, the first control device 61 sets the predetermined W value such that the ejection amount of the white ink to the first region A1 becomes the third predetermined amount. Accordingly, the white ink is ejected to the region of the printing medium A corresponding to the ejection pixel having the RGB value: (254, 254, 254).

In the embodiment described above and the modifications, as illustrated in the example of FIG. 7B, the third predetermined amount of the first liquid is larger than the fourth predetermined amount thereof, but the third predetermined amount may be smaller than the fourth predetermined amount. For example, when the first liquid is the first ink such as the white ink, the ejection amount of the first ink to the first region A1 is smaller than the fourth predetermined amount, and thus it is possible to expect an effect that color emphasis of the first ink in the first region A1 is weakened, and the hue including the color of the first ink and the color of the printing medium A can be represented. Further, for example, when the first liquid is the pre-processing liquid for the ink and the second liquid such as the ink is not ejected to the first region A1, it is possible to reduce waste of the pre-processing liquid.

The present disclosure can be applied to a printing apparatus, a control method for a printing apparatus, and a non-transitory computer readable storage medium storing a program capable of ejecting a liquid in an appropriate amount corresponding to a region of a printing medium.

What is claimed is:

1. A printing apparatus comprising:

a first inkjet head configured to eject a first liquid to a printing medium;

a second inkjet head configured to eject a second liquid different from the first liquid to the printing medium; and a control device, wherein the control device is configured to:

execute a first printing operation and a second printing operation as a printing operation, an ejection amount of the first liquid in the first printing operation being different from an ejection amount of the first liquid in the second printing operation, the printing operation comprising:

forming a first layer by ejecting the first liquid from the first inkjet head to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second inkjet head on the first layer in the second region, wherein in the first printing operation, the control device causes the first liquid in a first predetermined amount to be ejected to the first region and causes the first liquid in a second predetermined amount to be ejected to the second region, and wherein in the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

2. The printing apparatus according to claim 1, wherein in a case in which a first ink is to be ejected as the first liquid and a second ink is to be ejected as the second liquid in the second printing operation, the control device is configured to cause the first ink to be ejected to an approximate color region of the printing medium in an amount between the third predetermined amount and the fourth predetermined amount, the approximate color region being printed in an approximate color having a color value within a predetermined range with respect to a color of the first ink.

3. The printing apparatus according to claim 1, wherein in a case in which a first ink is to be ejected as the first liquid and a second ink is to be ejected as the second liquid in the second printing operation, the control device is configured to cause the first ink to be ejected to an adjacent region in an amount smaller than the fourth predetermined amount, the adjacent region being a region of the first region adjacent to the second region or a region in the second region adjacent to the first region.

4. The printing apparatus according to claim 1, further comprising:

a carriage configured to reciprocate the first inkjet head along a first direction, wherein the first inkjet head comprises a plurality of nozzles configured to allow a first ink to be ejected therefrom as the first liquid, and wherein the control device is configured to:

cause, in a case of executing the first printing operation, the first ink in the first predetermined amount to be ejected to the first region by causing the first ink in a first amount to be ejected from each of nozzles in a first nozzle group while reciprocating the first inkjet head about a first number of times, the first nozzle group comprising at least one of the plurality of nozzles of the first inkjet head, a number of the nozzles in the first nozzle group being a first predetermined number; and cause, in a case of executing the second printing operation, the first ink in the third predetermined amount to be ejected to the first region while reciprocating the first inkjet head about the first number of times, by:

causing the first ink in a second amount equal to the first amount to be ejected from each of nozzles in a second nozzle group, the second nozzle group comprising at least two of the plurality of nozzles of the first inkjet head, a number of the nozzles in the second nozzle group being a second predetermined number larger than the first predetermined number;

causing the first ink in a third amount larger than the first amount to be ejected from each of nozzles in a third nozzle group, the third nozzle group comprising at least one of the plurality of nozzles of the first inkjet head, a number of the nozzles in the third nozzle group being a third predetermined number equal to the first predetermined number; or causing the first ink in a fourth amount larger than the first amount to be ejected from each of nozzles in a fourth nozzle group, the fourth nozzle group comprising at least two of the plurality of nozzles of the first inkjet head, a number of the nozzles in the fourth nozzle group being a fourth predetermined number larger than the first predetermined number.

5. The printing apparatus according to claim 1, further comprising:

a carriage configured to reciprocate the first inkjet head along a first direction, wherein the control device is configured to:

cause, in a case of executing the first printing operation, a first ink to be ejected as the first liquid in the first predetermined amount from the first inkjet head to the first region while reciprocating the first inkjet head about a first number of times; and cause, in a case of executing the second printing operation, the first ink in the third predetermined amount to be ejected from the first inkjet head to the first region while reciprocating the first inkjet head about a second number of times larger than the first number of times.

6. A printing apparatus comprising:

a first ejection device configured to eject a first liquid to a printing medium;

a second ejection device configured to eject a second liquid different from the first liquid to the printing medium; and a control device, wherein the control device is configured to:

execute a first printing operation and a second printing operation as a printing operation, an ejection amount of the first liquid in the first printing operation being different from an ejection amount of the first liquid in the second printing operation, the printing operation comprising:

forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region, wherein in the first printing operation, the control device causes the first liquid in a first predetermined amount to be ejected to the first region and causes the first liquid in a second predetermined amount to be ejected to the second region, and wherein in the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

7. A control method for a printing apparatus, the printing apparatus comprising: a first ejection device configured to eject a first liquid to a printing medium; and a second ejection device configured to eject a second liquid to the printing medium, the control method comprising:

executing a first printing operation and a second printing operation as a printing operation, an ejection amount of the first liquid in the first printing operation being different from an ejection amount of the first liquid in the second printing operation, the printing operation comprising:

forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region, wherein in the first printing operation, the control device causes the first liquid in a first predetermined amount to be ejected to the first region and causes the first liquid in a second predetermined amount to be ejected to the second region, and wherein in the second printing operation, the control device causes the first liquid in a third predetermined amount to be ejected to the first region and causes the first liquid in a fourth predetermined amount to be ejected to the second region such that an absolute value of a difference acquired by subtracting the fourth predetermined amount from the third predetermined amount is larger than an absolute value of a difference acquired by subtracting the second predetermined amount from the first predetermined amount.

8. A non-transitory computer readable storage medium storing a program for a printing apparatus, the printing apparatus comprising: a first ejection device configured to eject a first liquid to a printing medium; and a second ejection device configured to eject a second liquid different from the first liquid to the printing medium, the program comprising instructions that, when executed by a computer of the printing apparatus, cause the computer to execute:

a first printing operation and a second printing operation as a printing operation, an ejection amount of the first liquid in the first printing operation being different from an ejection amount of the first liquid in the second printing operation, the printing operation comprising:

forming a first layer by ejecting the first liquid from the first ejection device to a first region of the printing medium and a second region of the printing medium different from the first region, the first region being a predetermined region of the printing medium, a region of the printing medium designated by a user, or a region of the printing medium where the second liquid is not ejected; and forming a second layer by ejecting the second liquid from the second ejection device on the first layer in the second region, wherein in the first printing operation, the first liquid in a first predetermined amount is caused to be ejected to the first region and the first liquid in a second predetermined amount is caused to be ejected to the second region, and wherein in the second printing operation, the first liquid in a third predetermined amount is caused to be ejected to the first region and the first liquid in a fourth predetermined amount is caused to be ejected to the second region such that an absolute value of a difference acquired by subtracting the fourth predetermined amount from the third predetermined amount is larger than an absolute value of a difference acquired by subtracting the second predetermined amount from the first predetermined amount.

* * * * *